(12) United States Patent
Oshima

(10) Patent No.: US 8,159,711 B2
(45) Date of Patent: Apr. 17, 2012

(54) PRINTING SYSTEM HAVING AN INFORMATION PROCESSING APPARATUS, A PRINTER AND A COLLATOR

(75) Inventor: Keita Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 12/270,743

(22) Filed: Nov. 13, 2008

(65) Prior Publication Data

US 2009/0128850 A1    May 21, 2009

(30) Foreign Application Priority Data

Nov. 16, 2007   (JP) ................. 2007-298396

(51) Int. Cl.
G06K 15/00 (2006.01)
G06F 3/12 (2006.01)
G06F 17/30 (2006.01)
H04N 1/00 (2006.01)
B65H 83/00 (2006.01)

(52) U.S. Cl. ........ 358/1.18; 358/1.1; 358/403; 707/736; 707/752; 382/101; 271/3.04

(58) Field of Classification Search ................. 358/1.1, 358/1.18, 403; 707/616, 736, 752, 753; 382/101; 271/3.04
See application file for complete search history.

(56) References Cited

U.S. PATENT DOCUMENTS

2002/0184324 A1*   12/2002   Carlin et al. ................. 709/206
* cited by examiner

*Primary Examiner* — Thomas Lett
(74) *Attorney, Agent, or Firm* — Canon USA, I.P. Division

(57) ABSTRACT

It is determined whether fixed data used for a plurality of pages is merged with variable data different from the fixed data on a page-by-page basis or on a record-by-record basis. If it is determined that the fixed data is merged with the variable data on the page-by-page basis, the fixed data is merged with the variable data and print data composing printed pages into which at least one insertion page is inserted for every predetermined number of pages is generated.

9 Claims, 24 Drawing Sheets

|  | X | Y | Z |
|---|---|---|---|
| FIRST RECORD | a | b | c |
| SECOND RECORD | d | e | f |
| THIRD RECORD | g | h | i |

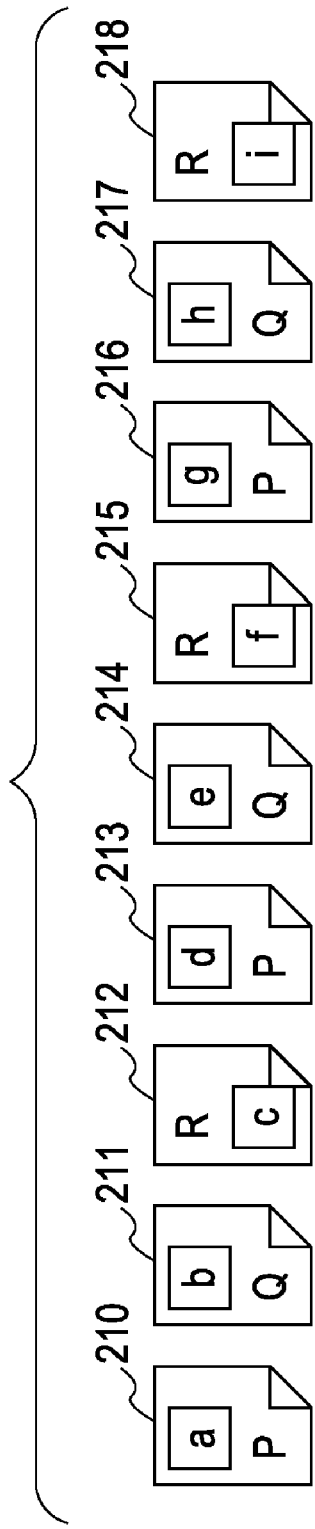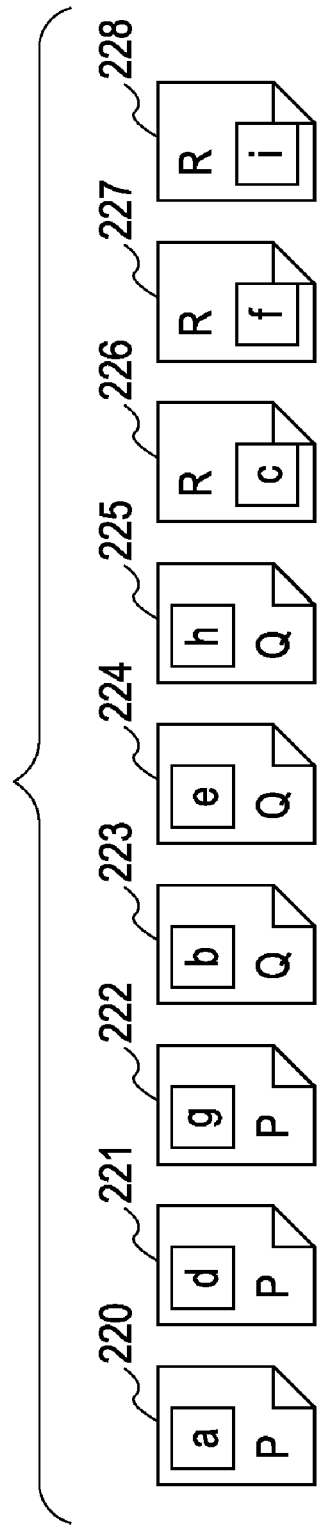

FIG. 13

```
1 <JobTicket JobID="jobid12345
   Sides="OneSided">
2   <Data Filename="file12345.pdf"/>
3   <Media Type="media-0"/>
4   <Disjointing Amount="3"/>
5 </JobTicket>
```

FIG. 14

```
1 <JobTicket JobID="jobid12345
   Sides="OneSided">
2   <Data Filename="file12345.pdf"/>
3   <Media Type="media-0"/>
4   <Disjointing Amount="4"/>
5 </JobTicket>
```

```
1  <JobTicket JobID="jobid12345" Sides="OneSided">
2    <Data Filename="file12345.pdf"/>
3    <Media Type="media-0"/>
4    <InsertSheet Page="2" InsertPos="after">
5      <Media Type="media-1"/>
6    </InsertSheet>
7    <InsertSheet Page="5" InsertPos="after">
8      <Media Type="media-1"/>
9    </InsertSheet>
10   <InsertSheet Page="8" InsertPos="after">
11     <Media Type="media-1"/>
12   </InsertSheet>
13   <Disjointing Amount="3"/>
14 </JobTicket>
```

FIG. 15

FIG. 16
```
1 <JobTicket JobID="jobid12345" Amount="3">
2 </JobTicket>
```

FIG. 17
```
1 <JobTicket JobID="jobid12345">
2   <InsertSheet NumberOfSheets="2" InsertPos="after">
3     <Media Type="media-1"/>
4   </InsertSheet>
5 </JobTicket>
```

FIG. 18
```
1 <JobTicket JobID="jobid12345" Amount="4">
2   <Process mode="coating"/>
3 </JobTicket>
```

FIG. 19
```
1 <JobTicket JobID="jobid12345">
2   <Check Frequency="3"/>
3 </JobTicket>
```

```
1 <JobTicket JobID="jobid12345 Sides="OneSided">
2   <Data Filename="file12345.pdf"/>
3   <Media Type="media-0"/>
4   <OutputBin Page="1 to 4" Location="Bin1"/>
5   <OutputBin Page="5 to 8" Location="Bin2"/>
6   <OutputBin Page="9 to 12" Location="Bin3"/>
7 </JobTicket>
```

```
 1  <JobTicket JobID="jobid12345" Sides="OneSided">
 2    <Data Filename="file12345.pdf"/>
 3    <Media Type="media-0"/>
 4    <InsertSheet Page="2" InsertPos="after">
 5      <Media Type="media-1"/>
 6    </InsertSheet>
 7    <InsertSheet Page="5" InsertPos="after">
 8      <Media Type="media-1"/>
 9    </InsertSheet>
10    <InsertSheet Page="8" InsertPos="after">
11      <Media Type="media-1"/>
12    </InsertSheet>
13    <OutputBin Page="1 to 3" Location="Bin1"/>
14    <OutputBin Page="4 to 6" Location="Bin2"/>
15    <OutputBin Page="7 to 9" Location="Bin3"/>
16  </JobTicket>
```

PRINTING SYSTEM HAVING AN INFORMATION PROCESSING APPARATUS, A PRINTER AND A COLLATOR

BACKGROUND OF THE INVENTION

1. Field of the Invention

The present invention relates to an information processing apparatus, a method of controlling printing, and a computer-readable storage medium.

2. Description of the Related Art

In the field of commercial printing, the orders for higher-value added small lot jobs are increased in number and the delivery times of such jobs is increasingly shortened. Accordingly, in addition to offset printers and post-processors in related art, print-on-demand (hereinafter referred to as POD) printers, which are digital printers, are actively introduced for variable data printing (hereinafter referred to as VDP).

In the initial VDP, VDP jobs are discriminated from offset printing jobs. The VDP jobs are processed by the POD printers whereas the offset printing jobs for mass printing of fixed data are processed by the offset printers.

Processing of mixed jobs by using both the POD printers and the offset printers is demanded in recent years, instead of the separate use of the VDP jobs and the offset printing jobs. Combinations of offset printers, offline post-processors, bookbinders, and POD devices are used for the mixed jobs because of the costs and processing times of the jobs.

Collation printing in which outputs are normally sorted on a record-by-record basis is performed in the VDP using the POD printers in the related art. In contrast, external collators are used in the offset printing to sort multiple quires.

In the processing of the mixed jobs from both the POD printers and the offset printers, it is necessary to merge printed sheets output from the respective printers. However, it is not easy to merge the printed sheets of the mixed jobs when the printed sheets are output in different output orders in the POD printers and the offset printers.

It is very important to prevent erratic pagination and missing pages in the VDP. This is because many VDP jobs are closely associated with information about customers and it is likely to disclose inappropriate information to the customers when the erratic pagination and/or the missing pages occur. In other words, it is necessary for commercial printers that deal with the VDP jobs to reliably detect and prevent the erratic pagination and the missing pages of the printed sheets because the presence of the erratic pagination and/or the missing pages may cause disclosure of information concerning the privacy of the customers. However, in the case of the collation printing using only the POD printers, any error affecting the privacy of customers does not occur.

The mechanical structures of the sheet conveying units in collators are improved in the collation in, for example, the offset printing in the related art in order to prevent the erratic pagination and the missing pages. In addition, image recognition technologies are improved to detect the erratic pagination that is not resolved only by the mechanical improvement.

In order to overcome the limitation of the image recognition to extract characteristics of prints, Japanese Patent Publication No. 5-5680 discloses a method of printing marking on quires and recognizing the markings.

Such a recognition method is effective for removing defective sheets when a large number of the same prints are output. When the number of the output prints becomes short as the result of the removal of the defective sheets, it is sufficient to simply reprint the same prints by the shortfall.

In the VDP in the related art, the printed sheets are output in the order similar to the order in which the printed sheets are output on a record-by-record basis from a variable database. The output on a record-by-record basis is also called the output on a set-by-set basis. Accordingly, the collating process becomes complicated when the printed sheets in the VDP are merged with the printed sheets output on a quire-by-quire basis in the offset printing.

In addition, when the printed sheets in the VDP are output on a page-by-page basis, the collation is performed also to the pages of the VDP jobs as the post-processing. In the case of the VDP in which the collation of the printed sheets is not performed, it is necessary to reliably detect and prevent the erratic pagination and the missing pages so that no error occurs in the content of each set and the binding result, as described above.

In the output of a large number of the same prints in the related art, even if double feeding occurs, removal of only the sets in which the double feeding occurs causes no problem in the remaining sets. However, in the VDP jobs, if the printed sheets become out of order as the result of the double feeding, all the subsequent sets are affected by the out-of-order. Accordingly, the method of detecting the erratic pagination by using markings, which is used when a large number of the same prints are output and which is disclosed in, for example, Japanese Patent Publication No. 5-5680, is not disadvantageously effective for the VDP jobs.

Furthermore, even if the erratic pagination can be detected, it is necessary to reprint all the VDP jobs because the double feeding has the effect on the remaining sets. Consequently, the cost in failure cases may be increased when the VDP jobs are mixed with the offset printing jobs.

The present invention is provided to facilitate confirmation of whether the printed sheets are correctly sorted in all the records in the VDP (assurance of output results in the VDP) and to realize the mixing of the VDP jobs with the offset printing jobs.

SUMMARY OF THE INVENTION

According to an embodiment of the present invention, an information processing apparatus includes a determining unit configured to determine whether fixed data used for a plurality of pages is merged with variable data different from the fixed data on a page-by-page basis or on a record-by-record basis and a print data generating unit configured to merge the fixed data with the variable data and generate print data composing printed pages into which at least one insertion page is inserted for every predetermined number of pages if the determining unit determines that the fixed data is merged with the variable data on the page-by-page basis.

According to another embodiment of the present invention, a control method includes the steps of determining whether fixed data used for a plurality of pages is merged with variable data different from the fixed data on a page-by-page basis or on a record-by-record basis; and merging the fixed data with the variable data and generating print data composing printed pages into which at least one insertion page is inserted for every predetermined number of pages if the determining determines that the fixed data is merged with the variable data on the page-by-page basis.

According to another embodiment of the present invention, a computer-readable storage medium stores a program including computer-executable instructions for determining whether fixed data used for a plurality of pages is merged with variable data different from the fixed data on a page-by-page basis or on a record-by-record basis and computer-executable instructions for merging the fixed data with the variable data and generating print data composing printed pages into which at least one insertion page is inserted for every predetermined number of pages if it is determined that the fixed data is merged with the variable data on the page-by-page basis.

Further features of the present invention will become apparent from the following description of exemplary embodiments with reference to the attached drawings.

BRIEF DESCRIPTION OF THE DRAWINGS

FIG. 6 shows an example of pages output on a set-by-set basis (on a record-by-record basis).

FIG. 7 shows an example of pages output on a page-by-page basis.

FIG. 13 shows an example of a job ticket that is generated by a job ticket generator and is transmitted to a digital printer.

FIG. 14 shows another example of the job ticket that is generated by the job ticket generator and is transmitted to the digital printer.

FIG. 15 shows another example of the job ticket that is generated by the job ticket generator and is transmitted to the digital printer.

FIG. 16 shows an example of a job ticket that is generated by the job ticket generator and is transmitted to an offset printer.

FIG. 17 shows an example of a job ticket that is generated by the job ticket generator and is transmitted to an offline post-processor.

FIG. 18 shows an example of a job ticket that is generated by the job ticket generator and is transmitted to another offline post-processor.

FIG. 19 shows an example of a job ticket that is generated by the job ticket generator and is transmitted to the collator.

FIG. 29 shows an example of a job ticket according to a third exemplary embodiment.

FIG. 30 shows another example of the job ticket according to a third exemplary embodiment.

DESCRIPTION OF THE EMBODIMENTS

Figure 1:
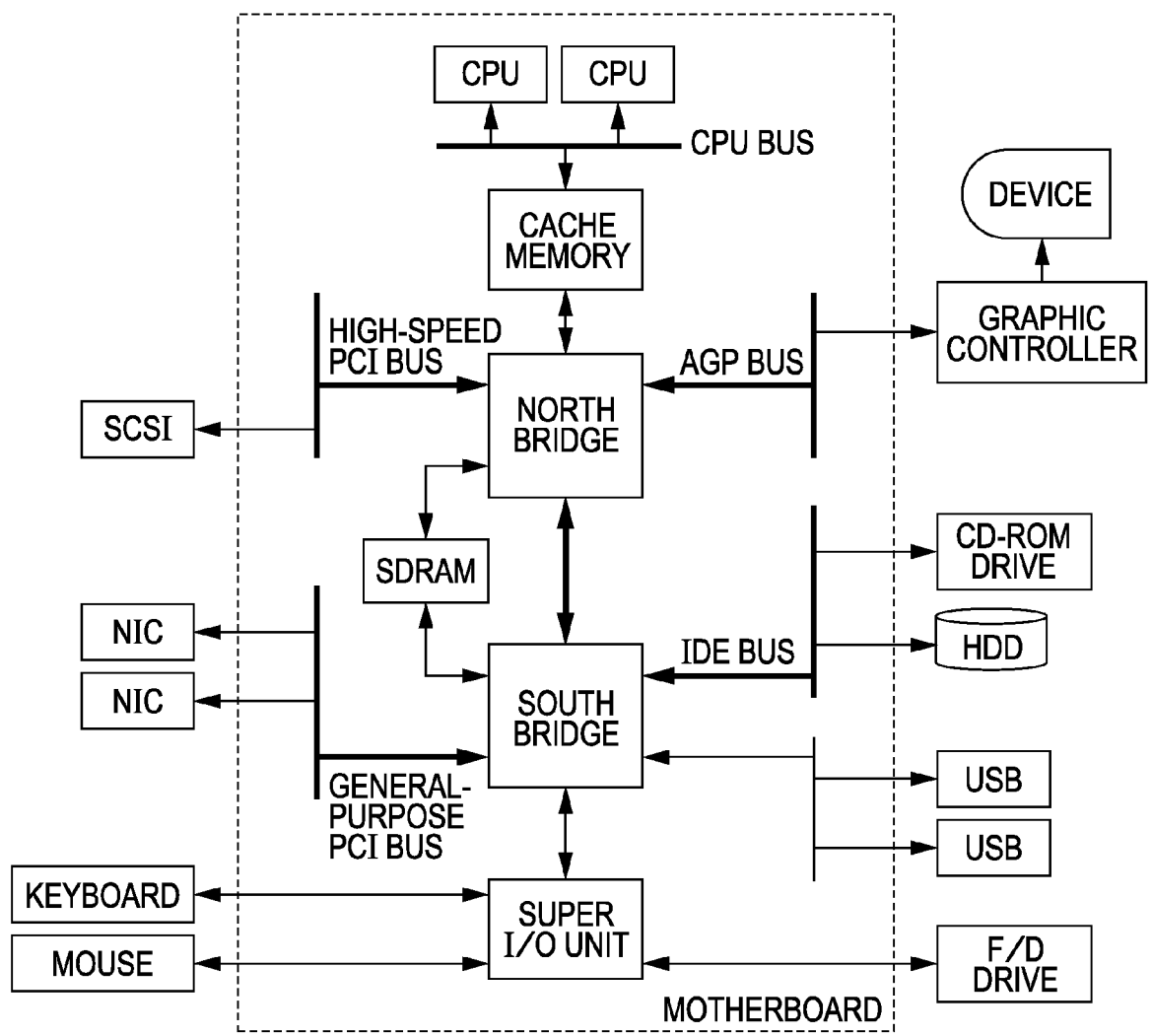
FIG. 1 illustrates an example of the hardware configuration of a personal computer.

FIG. 1 illustrates an example of the hardware configuration of a personal computer (PC) (an information processing apparatus or a computer).

Various connection methods and various buses and interfaces are generally used in the hardware configurations of PCs and the hardware configuration shown in FIG. 1 is only an example.

Referring to FIG. 1, a portion surrounded by a broken line is a circuit board called a motherboard on which functions described below are mounted. Two central processing units (CPUs) control the entire PC. The two CPUs are connected to a cache memory via a CPU bus. Large-scale integration (LSI) chips called a north bridge and a south bridge control the various buses on the motherboard. A memory, such as a synchronous dynamic random access memory (SDRAM), is used for primary storage of data in the PC, including exchange of data between the north bridge and the south bridge.

The north bridge is provided with a high-speed peripheral component interconnect (PCI) bus, such as 32-bit 66-Mhz PCI bus. The north bridge may be provided with a higher-speed PCI Express bus or PCI-X bus. The north bridge uses the high-speed PCI bus through which the north bridge can access a small computer system interface (SCSI) external device (for example, a high-capacity hard disk drive (HDD)) via an SICI controller and an SCSI interface. A graphic controller for display in a display device is also connected to the north bridge via an accelerated graphics port (AGP) bus.

The south bridge has a general-purpose PCI bus (32 bits/33 MHz) connected thereto. A network interface card (NIC), such as the Ethernet (registered trademark), is connected to the south bridge through the general-purpose PCI bus. In a case where two network systems are supposed, two NICs are connected to the south bridge through the general-purpose PCI bus, as shown in FIG. 1. However, in a case where one network system is supposed, only one NIC may be connected thereto. When a high-speed NIC, such as Gigabit Ethernet, is used, the high-speed PCI bus connected to the north bridge may be used to ensure the performance. The south bridge also has an Integrated Drive Electronics (IDE) bus connected to thereto. An HDD, a compact disk-read only memory (CD-ROM) drive, a digital versatile disk (DVD) drive, and/or the like is connected to the IDE bus. The HDD stores a variety of data including control software for the PC. The CD-ROM drive, the DVD drive, etc. are useful for readout of data at installation of the PC and for storage (archive) of a large amount data. The south bridge can access universal serial bus (USB) external devices, typified by a USB memory, through a USB port. The PC is connected to a keyboard, a mouse, and/or a floppy (registered trademark) disk drive via a super input-output (I/O) unit to input and output data in and from the devices.

The CPU executes programs stored in, for example, the HDD to realize the functions of the PC and flowcharts described below.

Figure 2:
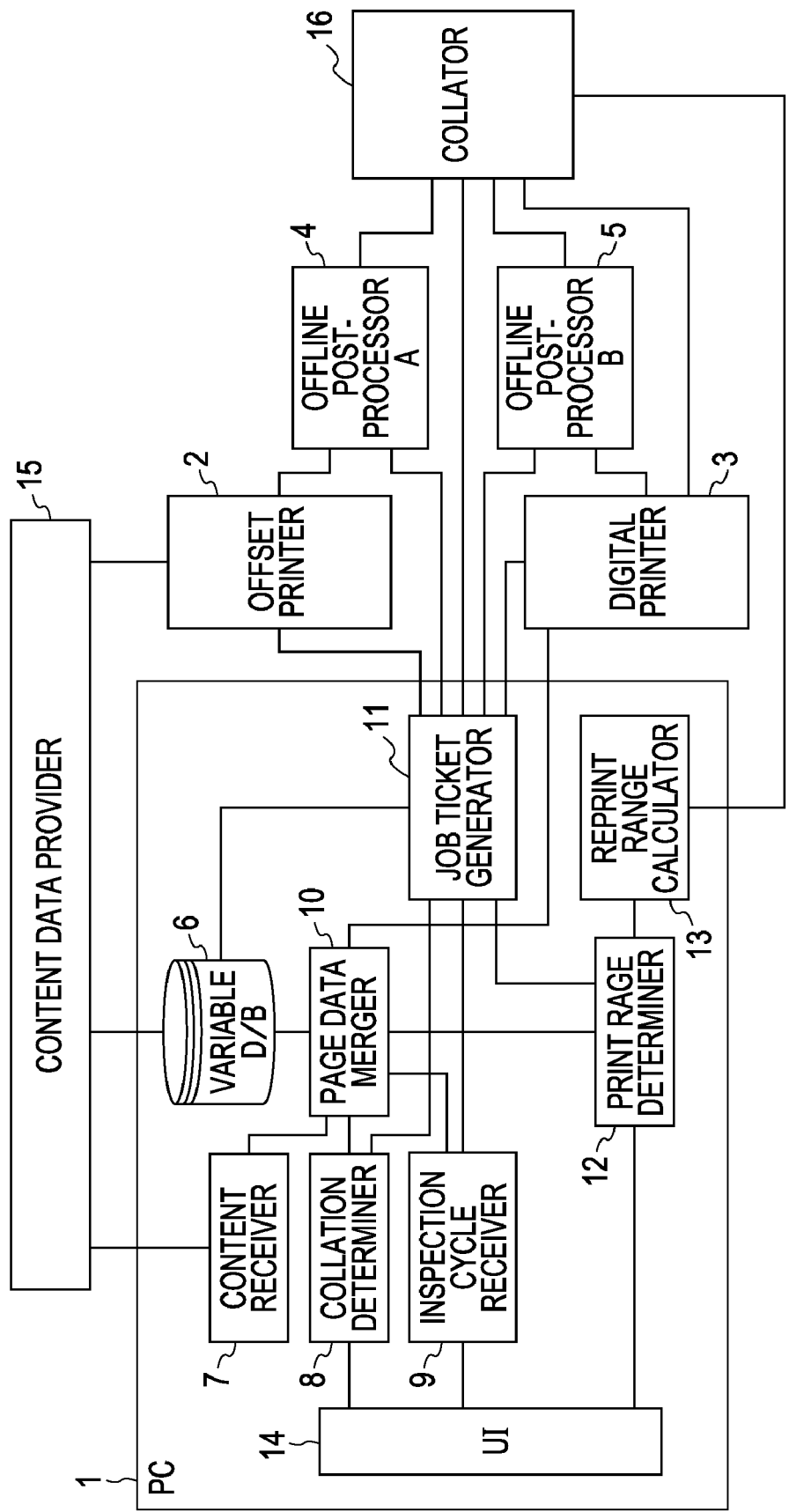
FIG. 2 is a block diagram showing an example of the functional configuration of a system according to a first exemplary embodiment.

FIG. 2 is a block diagram showing an example of the functional configuration of a system according to a first exemplary embodiment.

Referring to FIG. 2, a PC 1 serves as a printing control system, which is the main apparatus according to the first exemplary embodiment. The system includes an offset printer 2, which is an example of a plate printing system, a digital printer 3, an offline post-processor A 4 used with the offset printer 2, an offline post-processor B 5 used with the digital printer 3, and a collator 16 that collates outputs from the offset printer 2 and the digital printer 3.

The PC 1 includes a variable database (variable DB) 6, a content receiver 7, a collation determiner 8, and an inspection cycle receiver 9. The PC 1 also includes a page data merger 10, a job ticket generator 11, a print range determiner 12, a reprint range calculator 13, and a user interface (UI) 14.

A content data provider 15 supplies content data corresponding to jobs to the PC 1 and the offset printer 2.

A process in the system shown in FIG. 2 will now be described.

The content data provider 15 supplies page data for digital printing to the content receiver 7. The content data provider 15 also supplies page data for offset printing to the offset printer 2. The content data provider 15 stores variable data for variable data printing in the variable database 6.

A user (an operator) of the system operates the user interface 14 to process jobs.

The collation determiner 8 determines whether printed sheets are output on a set-by-set basis or a record-by-record basis or printed sheets are output on a page-by-page basis on the basis of an instruction from the user interface 14 (selection instruction information).

The inspection cycle receiver 9 determines whether at least one inspection sheet is inserted in the output on a record-by-record basis on the basis of an instruction from the user interface 14. The inspection cycle receiver 9 acquires the inspection cycle in accordance with an instruction from the user interface 14 (reception of the inspection cycle).

The print range determiner 12 determines an output page range in accordance with an instruction from the user interface 14. The print range determiner 12 may determine the output page range in accordance with an instruction from the reprint range calculator 13.

The page data merger 10 receives the fixed page data from the content receiver 7 and the variable data from the variable database 6 and merges the fixed page data with the variable data to compose page data (about print pages) to be output (merging of page data). The page data merger 10 merges the page data in response to instructions from the collation determiner 8, the inspection cycle receiver 9, and the print range determiner 12.

The job ticket generator 11 generates job tickets in accordance with the information from the variable database 6, the collation determiner 8, the inspection cycle receiver 9, and the print range determiner 12. The job tickets are used to control the offset printer 2, the digital printer 3, the offline post-processor A 4, the offline post-processor B 5, and the collator 16. The job ticket generator 11 transmits the job tickets to the respective blocks. The job ticket generator 11 transmits and receives the job tickets online to the digital printer 3. However, the job ticket generator 11 may transmit the instructions offline to the offset printer 2, the offline post-processor A 4, the offline post-processor B 5, and the collator 16. For example, the operator may receive a job ticket printed on a sheet of paper and may operate each device while reading the instruction on the job ticket.

The offset printer 2 prints the page data supplied from the content data provider 15 in response to the instruction from the job ticket generator 11.

The offline post-processor A 4 performs post-processing of outputs from the offset printer 2 in response to the instruction from the job ticket generator 11.

The digital printer 3 prints the page data supplied from the page data merger 10 in response to the instruction from the job ticket generator 11.

The offline post-processor B 5 performs the post-processing of outputs from the digital printer 3 in response to the instruction from the job ticket generator 11. The post-processing may not be performed in the case of the digital printer. In this case, the outputs from the digital printer 3 are directly transmitted to the collator 16. When the merging with the outputs from the offset printer 2 is not performed and the printed sheets are output on a set-by-set basis or a record-by-record basis, the outputs from the digital printer 3 are not transmitted to the collator 16 and the jobs are terminated when the printed sheets are output from the digital printer 3.

The collator 16 collates the outputs from the offline post-processor A 4 and the offline post-processor B 5 in response to the instruction from the job ticket generator 11. In the collation, the collator 16 confirms the state of sheets of paper inserted in sets of a predetermined number to check for the double feeding and inspects the sheets of paper for the erratic pagination and/or the missing pages. If the erratic pagination and/or the missing pages are detected, the collator 16 transmits information about the erratic pagination and/or the missing page to the reprint range calculator 13.

The reprint range calculator 13 calculates a reprint range on the basis of the information transmitted from the collator 16. The reprint range calculator 13 supplies an instruction to perform (instruct) the reprinting within the calculated rage to the print range determiner 12.

As in the job tickets described above, the connections of the inputs and outputs in and from the offline post-processor A 4 and the offline post-processor B 5 and the inputs and outputs in and from the collator 16 in FIG. 2 also show a flow of physical outputs, such as sheets of paper, in addition to the online flow.

An example of the user interface 14 will now be described.

Figure 3:
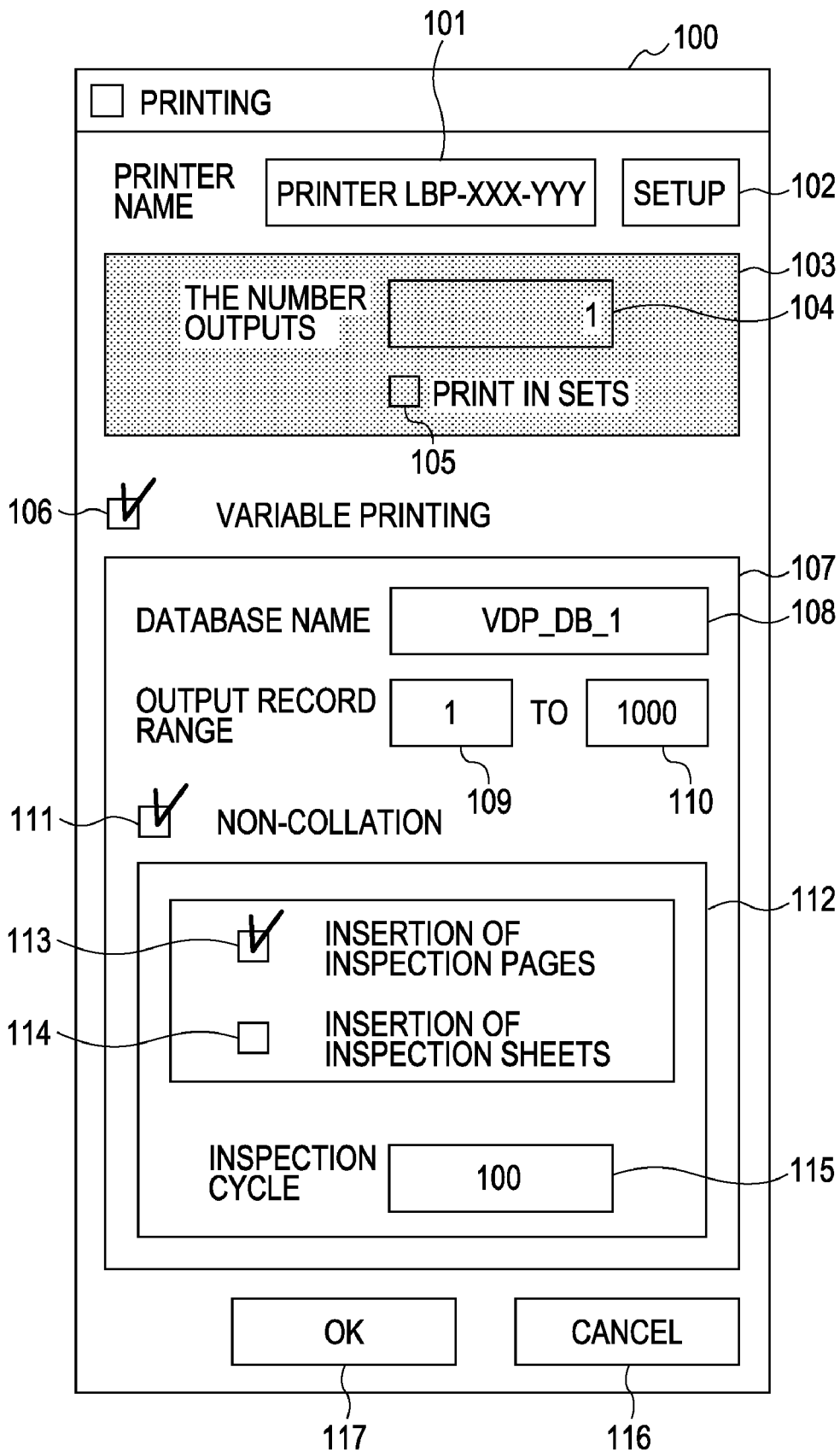
FIG. 3 illustrates an example of a user interface screen.

FIG. 3 illustrates an example of the user interface screen. This screen is displayed in the display device connected to the PC 1 in response to the processing with the user interface 14 in FIG. 2 and is operated with the input device connected to the PC 1, such as the keyboard or the mouse.

Referring to FIG. 3, reference numeral 100 denotes a screen used to make print settings and to instruct start of printing. Reference numeral 101 denotes an input field in which a destination digital printer is specified. Reference numeral 102 denotes a button used to make detailed settings. For example, the user can make detailed settings by pressing the button 102 to facilitate unloading of printed sheets output on a record-by-record basis or on a page-by-page basis. For example, an output destination selected from multiple output bins is specified to the digital printer or the positions where printed sheets of paper are output in a paper output tray are shifted to facilitate the unloading of the printed sheets in predetermined units.

Reference numeral 103 denotes an area where settings are made when variable printing is not performed. In the area 103, reference numeral 104 denotes an input field in which the number of output sheets of paper is specified. Reference numeral 105 denotes a check button used to specify the type of the output order. When the user instructs output of multiple sheets of paper in the field 104, the user turns on the check button 105 in the printing on a set-by-set basis and turns off the check button 105 in the printing on a page-by-page basis.

Reference numeral 106 denotes a check button used to specify whether the variable printing is performed. If the check button 106 is turned on, an area 107 is made active and the area 103 is made inactive. In contrast, if the check button 106 is turned off, the area 103 is made active and the area 107 is made inactive. In the example in FIG. 3, the check button 106 is turned on and the area 103 is made inactive.

In the area 107, settings concerning the outputs in the variable printing are made. Reference numeral 108 denotes an input field in which a database name where the variable data for the variable printing is referred to is specified. The database whose name is specified in the input field 108 corresponds to the variable database 6 in FIG. 2. Reference numeral 109 denotes an input field in which a start record number of the variable data to be output is input. Reference numeral 110 denotes an input field in which an end record number of the variable data is input. The user uses the input field 110 to specify which range in a table in the database specified in the input field 108 is to be printed.

Reference numeral 111 denotes a check button used to specify the type of the output order in the variable printing. The user turns on the check button 111 in the case of the printing on a page-by-page basis and turns off the check button 111 in the case of the printing on a record-by-record basis. When the check button 111 is turned on, an area 112 is made active where the user can make detailed settings. In the example in FIG. 3, the check button 111 is turned on and the area 112 is made active.

Reference numeral 113 denotes a check button used to specify whether an inspection page is inserted when the printing on a page-by-page basis is performed in the variable printing. Reference numeral 114 denotes a check button used to specify whether an inspection sheet is inserted when the printing on a page-by-page basis is performed in the variable printing. The check button 113 and the check button 114 can be set exclusively. Either one of the check button 113 and the check button 114 may be set or none of the check button 113 and the check button 114 may be set. Reference numeral 115 denotes an input field in which the insertion cycle is specified when pages or sheets are inserted. The insertion cycle corresponds to the number of records and represents the inspection cycle after the printed sheets are output to the collator. Reference numeral 117 denotes a print start button for starting the printing according to the settings. Reference numeral 116 denotes a print cancel button.

Referring back to FIG. 2, the collation determiner 8 determines whether the printed sheets are output on a page-by-page basis or on a record-by-record basis (set-by-set basis) in accordance with the settings in the check button 106 and the check button 111 in FIG. 3.

The inspection cycle receiver 9 determines whether the inspection is performed and specifies the inspection cycle in accordance with the settings in the check button 106, the check button 111, the check button 113, and the input field 115 in FIG. 3.

An example of the double feeding occurring when the printing and collation are performed in the output order determined in accordance with the settings specified in the user interface shown in FIG. 3 and how to detect the double feeding will now be described.

Figures 4, 5:
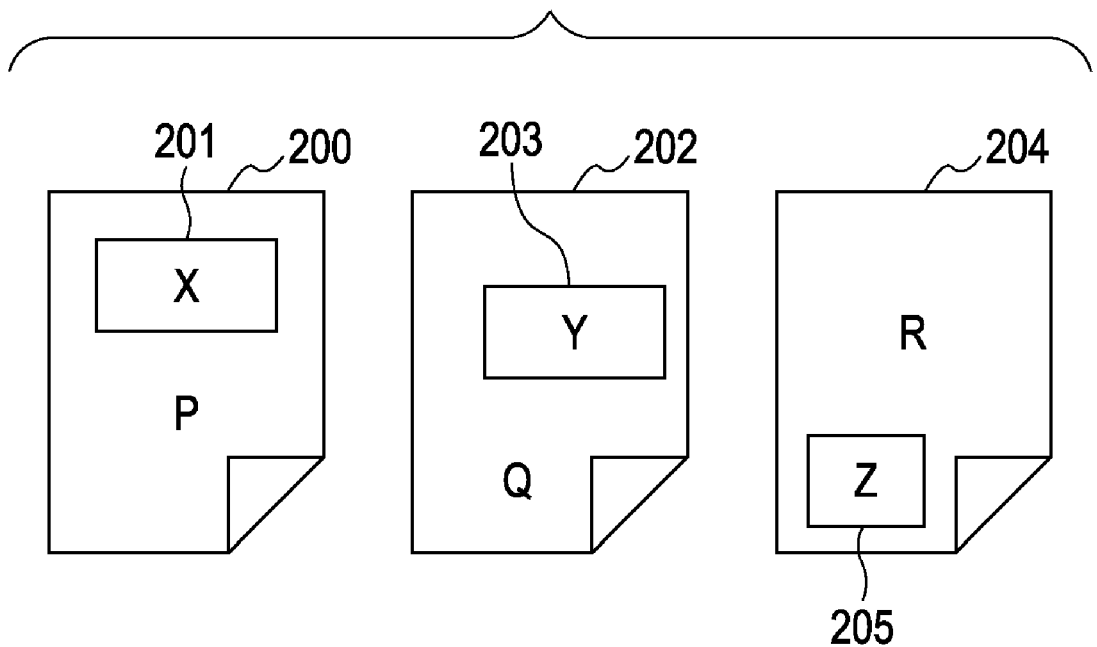
FIG. 4 illustrates data on three pages and the variable parts in content items for description of the variable printing.
FIG. 5 shows an example of a table in a database used in the variable printing.

FIG. 4 illustrates data on three pages and the variable parts in content items for description of the variable printing.

In the example shown in FIG. 4, three pages are single-sided printed for every record set. Reference numeral 200 denotes a first page. A part 201 in the first page 200 includes variable data. The part 201 is hereinafter represented as a field name "X". Fixed data represented by "P" is printed on the first page 200.

Similarly, reference numeral 202 denotes a second page. Reference numeral 203 denotes a field "Y" including variable data. Fixed data represented by "Q" is printed on the second page 202. Reference numeral 204 denotes a third page. Reference numeral 205 denotes a field "Z" including variable data. Fixed data represented by "R" is printed on the third page 204.

An example of the database in which the variable data applied to the "X", "Y", and "Z" fields is stored will now be described.

FIG. 5 shows an example of a table in a database used in the variable printing. Data corresponding to three records is stored in the table shown in FIG. 5. In the table in FIG. 5, the "X" field in a first record has a value "a", the "Y" field in the first record has a value "b", and the "Z" field in the first record has a value "c". Similarly, the "X", "Y", and "Z" fields in a second record have values "d", "e", and "f", respectively, and the "X", "Y", and "Z" fields in a third record have values "g", "h", and "i", respectively.

Application of the variable data shown in FIG. 5 to the page data shown in FIG. 4 provides a result shown in FIG. 6 in the output order in the printing on a set-by-set basis in the related art. FIG. 6 shows an example of pages output on a set-by-set basis (record-by-record basis).

In the example in FIG. 6, reference numeral 210 denotes a page that is output first, reference numeral 211 denotes a page that is output secondly, reference numeral 212 denotes a page that is output thirdly, and so on for reference numerals 213 to 217. Reference numeral 218 denotes a ninth page that is output finally.

If the user turns on the check button 106 and turns off the check button 111, the printed sheets are output in the order shown in FIG. 6.

If the user turns on the check button 106, turns on the check button 111, and the turns off the check button 113, the printed sheets are output in an order shown in FIG. 7. FIG. 7 shows an example of pages output on a page-by-page basis.

In the example in FIG. 7, reference numeral 220 denotes a page that is output first, reference numeral 221 denotes a page that is output secondly, reference numeral 222 denotes a page that is output thirdly, and reference numeral 228 denotes a ninth page that is output finally. For example, when the user sets the output pages in FIG. 7 in units of three sheets corresponding to the number of output records in the offline collator 16, the outputs in the variable printing can be easily collated.

Figure 8:
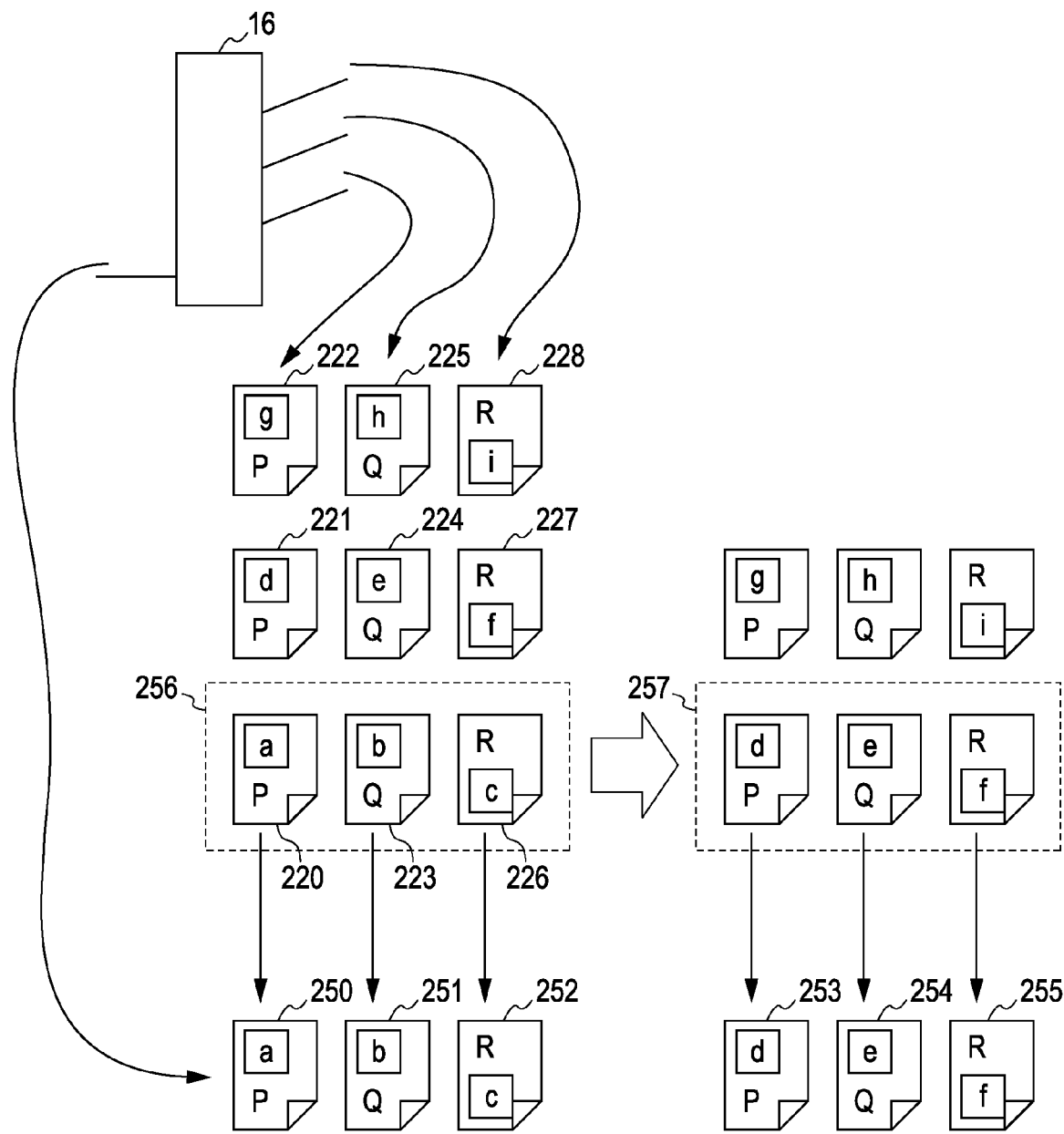
FIG. 8 shows an example indicating how to collate the output pages shown in FIG. 7 by a collator.

FIG. 8 shows an example indicating how to collate the output pages shown in FIG. 7 by the collator 16.

In the example in FIG. 8, for example, the user sets the pages 220, 221, and 222 in one input bin in the collator 16, sets the pages 223, 224, and 225 in the subsequent input bin therein, and sets the pages 226, 227, and 228 in the subsequent input bin therein. When the collator 16 extracts the first page from each of the three input bins, the sheets in a combination 256 are combined together to produce a set including pages 250, 251, and 252. This set corresponds to a first set in the collated output, that is, a first record. Similarly, the sheets in a combination 257 produces a second set including pages 253, 254, and 255.

Although the merging of the jobs of the offset printer with the jobs of the digital printer is included in the processing range in the first exemplary embodiment, only the outputs in FIG. 7 from the digital printer are shown in FIG. 8 for simplicity. For example, the user can set the quires from the offset printer in another appropriate input bin to merge the jobs of the offset printer with the jobs of the digital printer.

The example in FIG. 8 shows a normal state in which the erratic pagination and the missing pages, including the double feeding in the collator 16, do not occur. However, the collation cannot possibly be performed in the appropriate combinations due to the state of the machine or the sheets of paper. An example of the collation when the double feeding occurs will now be described.

Figure 9:
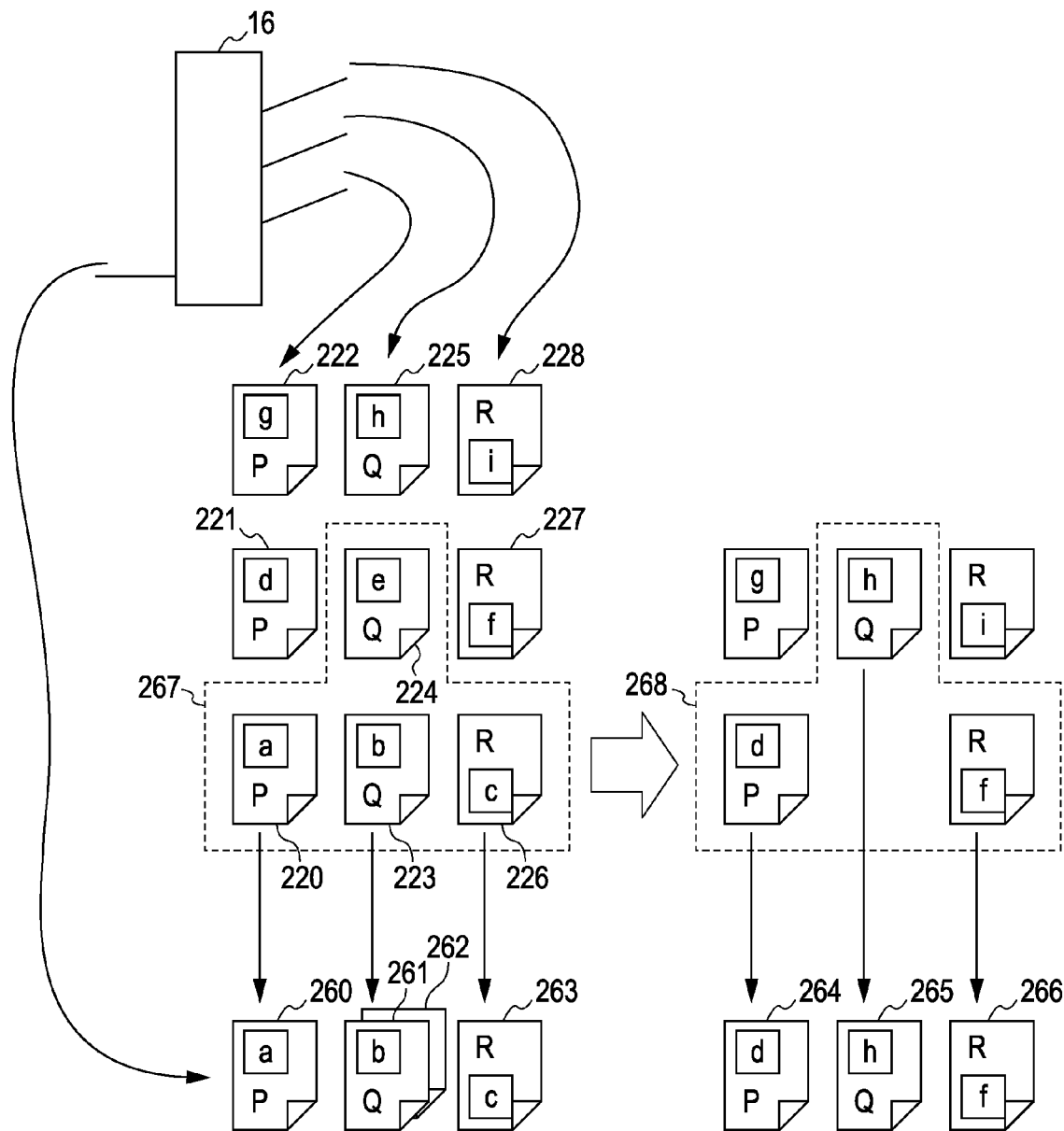
FIG. 9 shows an example in which printed sheets are set in the same condition as in FIG. 8 and double feeding occurs in the operation of the collator.

FIG. 9 shows an example in which the printed sheets are set in the same condition as in FIG. 8 and the double feeding occurs in the operation of the collator.

In the example in FIG. 9, the pages 223 and 224 are concurrently conveyed in a combination 267 for the first record. As a result, a combination for the first set includes pages 260, 261, 262, and 263. The combination for the first set includes the sheets more than those in the combination for the first record. In addition, since the page 224 is conveyed with the first set, the pages 221, 225, and 227 form a combination 268 for the second set that includes pages 264, 265, and 266. Although the combination 268 for the second set is correct as the combination for the fixed page data, it is not valid as the combination for the second record because the variable data is shifted. This shift continues to have the effect on the subsequent collating process.

In order to detect an occurrence of the erratic pagination as in the example in FIG. 9, the page insertion based on the setting of the check button 113 in FIG. 3 is performed. An exemplary output when the page insertion is performed will now be described.

Figure 10:
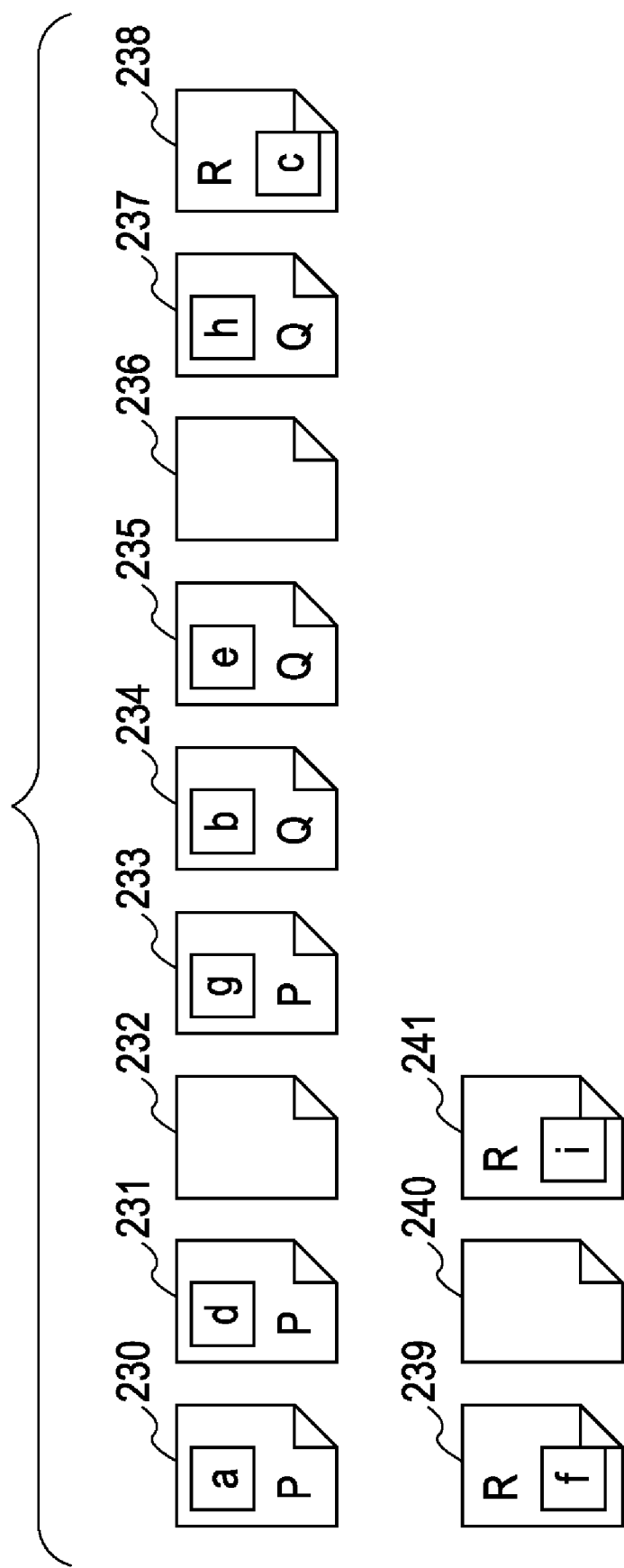
FIG. 10 shows an exemplary print result by using the user interface screen in FIG. 3.

FIG. 10 shows an exemplary print result when the check button 106 is turned on, the check button 111 is turned on, the check button 113 is turned on, and the input field 115 includes a value "3". Each of reference numeral 230 to 241 denotes a page of the print result. Although the output order of the printed sheets in FIG. 10 is the same as that in FIG. 7, the example in FIG. 10 differs from the example in FIG. 7 in that blank pages 232, 236, and 240 are inserted.

In the example in FIG. 10, for example, the user can set the output pages in units of four pages including the blank page in the collator 16 to cause the collator 16 to perform the collation.

Figure 11:
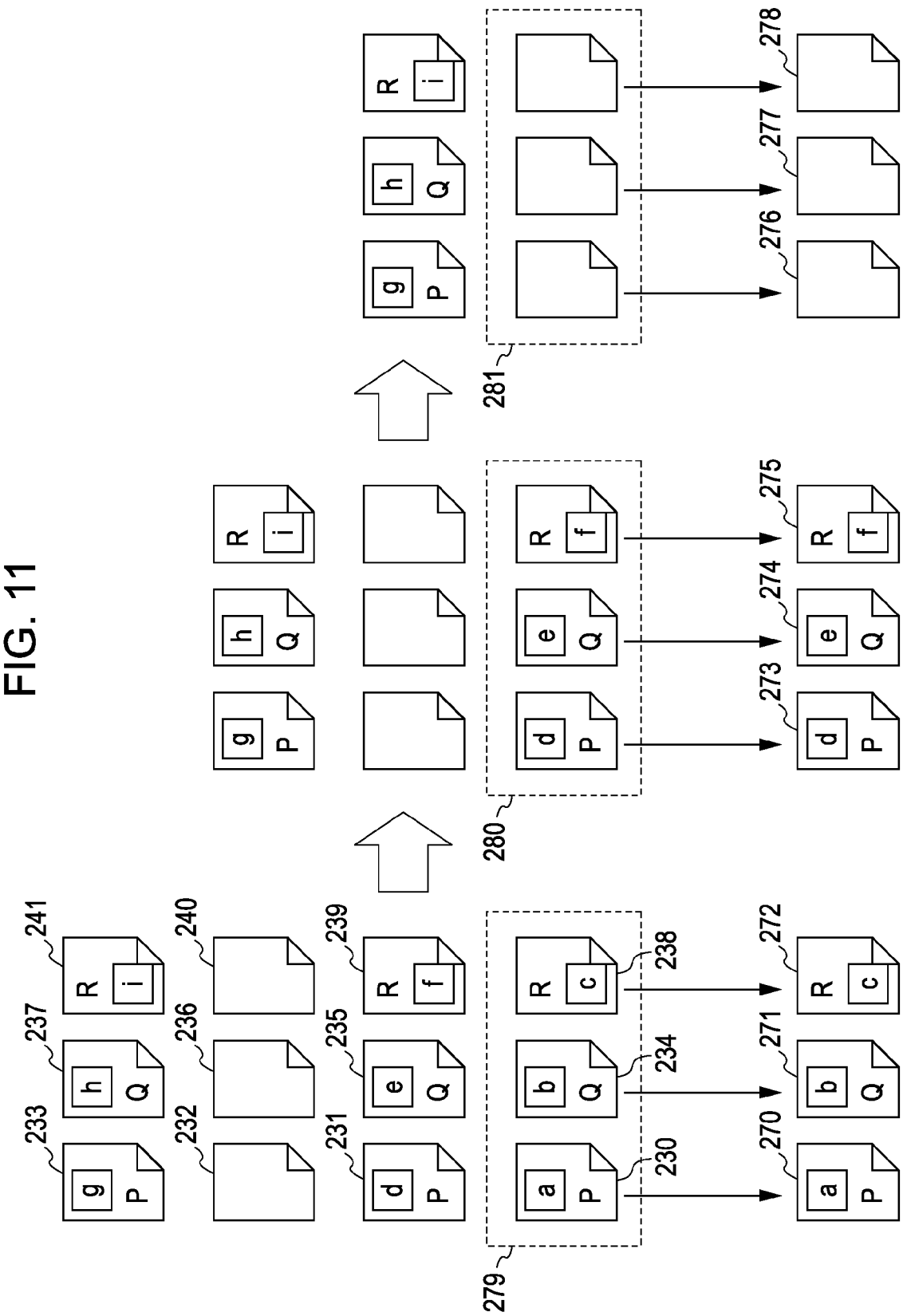
FIG. 11 shows an example in which the outputs in FIG. 10 are collated.

FIG. 11 shows an example in which the outputs in FIG. 10 are collated. An error by the double feeding does not occur in the example in FIG. 11.

In the example in FIG. 11, a combination 279 for a first set (including pages 270, 271, and 272) corresponds to the first record and a combination 280 for a second set (including pages 273, 274, and 275) corresponds to the second record. A combination 281 for a third set (including pages 276, 277, and 278) is used for the inspection. Since the combination 281 includes only the blank pages, the user can only watch the multiple pages to easily confirm whether an error by the double feeding or the like occurs. The user can also easily confirm whether an error by the double feeding or the like occurs by using an image recognition unit etc., instead of watching the multiple pages. The sets for the inspection are output on the inspection cycle specified in the input field 115 on the screen in FIG. 3. In the example in FIG. 11, the user or the image recognition unit (for example, the collator 16) determines that the erratic pagination does not occur and the collation is normally performed if the page set including only the blank pages is output as the third set.

Figure 12:
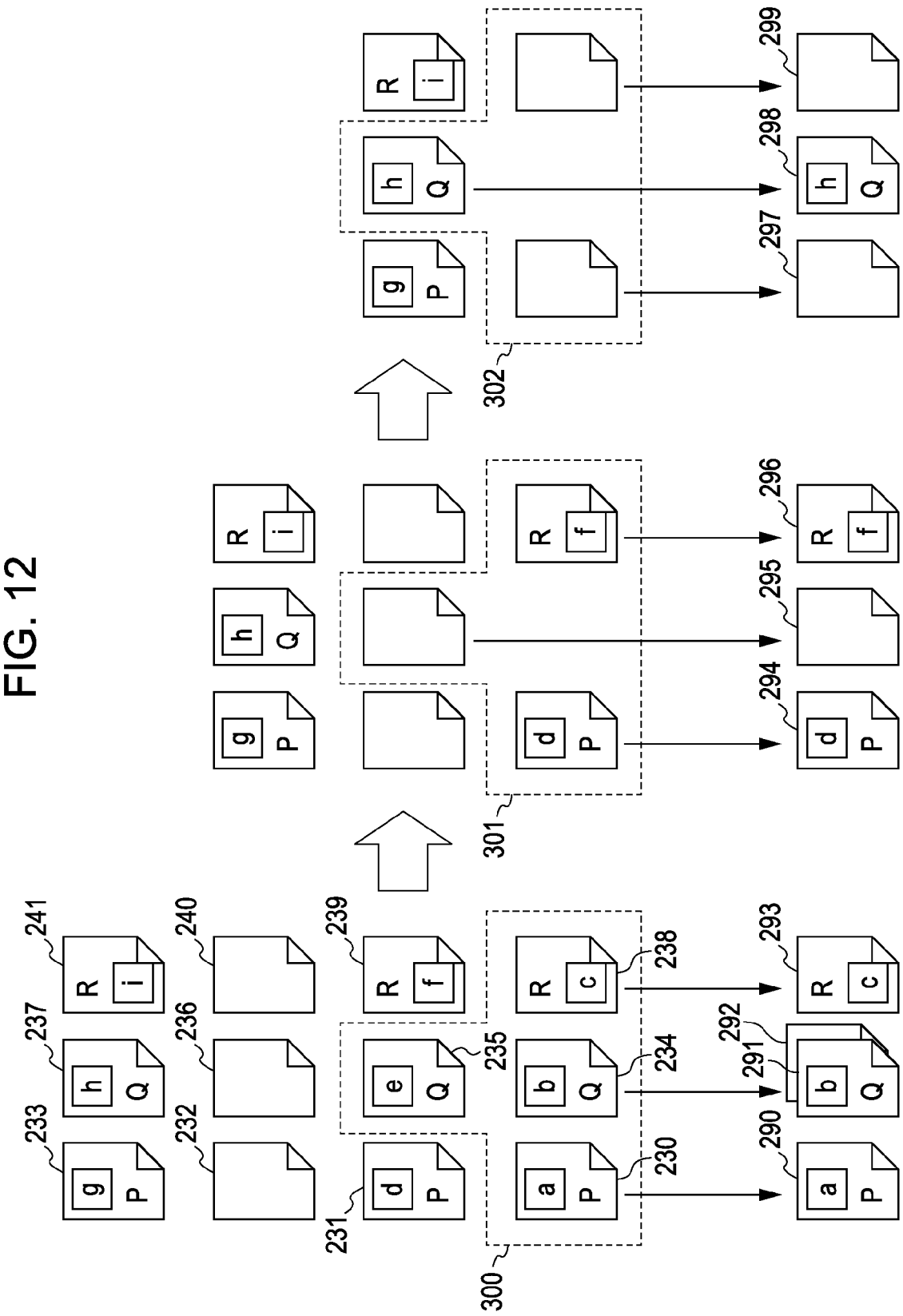
FIG. 12 shows an example in which the double feeding occurs under the same condition as in FIG. 11.

FIG. 12 shows an example in which the double feeding occurs under the same condition as in FIG. 11.

In the example in FIG. 12, the pages 234 and 235 are concurrently conveyed in a combination 300 for a first set (including pages 290, 291, 292 and 293). Accordingly, the shift occurring in the combination 300 affects combinations 301 (including pages 294, 295, and 296) and 302 (including pages 297, 298, and 299).

For example, the user inspects pages 297, 298 and 299 in a combination 302 for a third set, as in the example in FIG. 11. Since a page 237 is output as the page 298 despite the fact that a page 236 should be output as the page 298, the page 298 is not a blank sheet but a printed sheet. Accordingly, for example, the user can easily determine that the page other than the blank page is included in the set, so that the user can detect an occurrence of the double feeding.

As described above, the PC 1 can insert blank pages in predetermined positions in accordance with the settings to allow the user to easily detect the double feeding.

Control of each device by using the job ticket will now be described. FIG. 13 shows an example of a job ticket that is generated by the job ticket generator 11 and is transmitted to the digital printer 3.

A text document format using a markup language, such as Standard Generalized Markup Language (SGML) or Extensible Markup Language (XML), is used as the data format in the first exemplary embodiment. However, the data format of only the parts necessary for the description of the first exemplary embodiment is simply expressed and the used data format does not strictly conform to the specifications of the SGML or the XML.

The data in the example in FIG. 13 is composed of five lines. A description "<JobTicket>" in the first line indicates start of description of the data. A description "</JobTicket>" in the fifth line corresponds to the "<JobTicket>" in the first line and indicates end of the description of the data. Also in the subsequent data format, the description of a keyword is composed of multiple lines between the keyword line surrounded by "<" and ">" and the keyword line surrounded by "</" and ">".

The description "<JobTicket>" includes the other three lines.

In the first line, a description "JobID="jobid12345"" indicates that the identifier of the job specified by the job ticket is "jobid12345". Multiple jobs can be internally identified with this identifier. A description "Sides="OneSided" indicates that the job is a single-side printing job.

In the second line, a description "Filename="file12345.pdf"" indicates that the file name of document data input for the job specified by the job ticket is "file12345.pdf". This file name indicates data generated by the page data merger 10 in FIG. 2.

In the third line, a description "<Media Type="media-0"/>" indicates that the type of sheets of paper used in this job is represented by a name "media-0".

In the fourth line, a description "<Disjointing Amount="3"/>" indicates that the printed sheets are output while being disjointed in units of three sheets.

An example of a job ticket generated when the printing on a record-by-record basis is specified by an operation on the screen in FIG. 3 (when the check button 111 is turned off) is shown in FIG. 13. The job ticket in FIG. 13 is also used as an example of a job ticket generated when the printing on a page-by-page basis is specified (the check button 111 is turned on) and none of the page insertion of at least one page for inspection and the sheet insertion of at least one sheet for inspection is performed (both the check button 113 and the check button 114 are turned off). The example of the job ticket in FIG. 13 corresponds to the process in the output order shown in FIG. 6 or FIG. 7.

FIG. 14 shows another example of the job ticket that is generated by the job ticket generator 11 and is transmitted to the digital printer 3.

The job ticket in FIG. 14 differs from the job ticket in FIG. 13 in that the disjointing cycle specified in the fourth line is four in the job ticket in FIG. 14.

An example of a job ticket generated when the printing on a page-by-page basis is specified (the check button 111 is turned on) and the page insertion for inspection is specified (the check button 113 is turned on) by operations on the screen in FIG. 3 is shown in FIG. 14. The example of the job ticket in FIG. 14 corresponds to the process in the output order shown in FIG. 10. Since one blank page is inserted for every page unit in the example shown in FIG. 10, the value specified in the fourth line in FIG. 14 results from addition of the number of the blank page to the number in the fourth line in FIG. 13.

FIG. 15 shows another example of the job ticket that is generated by the job ticket generator 11 and is transmitted to the digital printer 3.

The first to third lines in the example in FIG. 15 are the same as in the example in FIG. 13.

In the fourth line in FIG. 15, a description "<InsertSheet Page="2" InsertPos="after">" indicates that a blank page is inserted after the second page. A description "<Media Type="media-1"/>" in the fifth line indicates that the type of the sheet inserted here is represented by a name "media-1". Similarly, a description in the seventh line indicates that the sheet of paper of the type "media-1" is inserted after the fifth page and a description in the tenth line indicates that the sheet of paper of the type "media-1" is inserted after the eighth page.

If the sheet of paper is inserted before the page number of specified as "Page", the description is changed to "InsertPos="before"".

A description in the thirteenth line indicates that the sheets are output while being disjointed in units of three sheets, as in the fourth line in FIG. 13. However, the inserted sheet is not counted here. In other words, the sheets are output while being disjointed in units of four sheets when the inserted sheet is included.

An example of a job ticket generated when the printing on a page-by-page basis is specified (the check button 111 is turned on) and the sheet insertion for inspection is specified (the check button 114 is turned on) by operations on the screen in FIG. 3 is shown in FIG. 15.

FIG. 16 shows an example of a job ticket that is generated by the job ticket generator 11 and is transmitted to the offset printer 2.

The job ticket shown in FIG. 16 is generated to instruct the merging with the outputs to the digital printer when the outputs in the variable printing printed in the digital printer are to be merged with the fixed page outputs printed in the offset printer in the collator 16. Accordingly, a description "Amount="3"" in the first line specifies the number of printed sheets, which is equal to the number of records in the outputs in the variable printing.

FIG. 17 shows an example of a job ticket that is generated by the job ticket generator 11 and is transmitted to the offline post-processor A 4.

The job ticket in FIG. 17 is generated to instruct insertion of the inspection sheet in the offline post-processor A 4 according to the job ticket shown in FIG. 16 when the inspection page or sheet is inserted in the outputs from the digital printer 3.

In the second line, a description "<Insertsheet NumberOfSheets="2" InsertPos="after">" indicates that an inspection quire is inserted after the second quire. In the third line, a description "<Media Type="media-1"/>" indicates that the type of the sheet inserted here is represented by a name "media-1".

FIG. 18 shows an example of a job ticket that is generated by the job ticket generator 11 and is transmitted to the offline post-processor B 5.

It is necessary to perform the printing on a page-by-page basis when special post-processing is performed only to specific pages resulting from the variable printing even if the merging with the outputs of the offset printing is not performed. The job ticket shown in FIG. 18 is an example of a job ticket generated in such a case. In the example in FIG. 18, the post-processing for coating of the surfaces of sheets of paper is performed only to specific pages.

In the first line, a description "Amount="4"" indicates that the number of sheets to be subjected to the coating is equal to four. The number of sheets indicates the number of sheets in one record including the inspection blank sheet in the example of the outputs shown in FIG. 10.

In the second line, a description "<Process mode="coating"/>" indicates that the coating is performed as the post-processing.

FIG. 19 shows an example of a job ticket that is generated by the job ticket generator 11 and is transmitted to the collator 16.

In the second line, a description "<Check Frequency="3"/>" indicates that the inspection is performed to determine whether a set of only the blank sheets is output for every three sets in the outputs from the collator.

For example, the collator 16 performs the inspection for every three sets, which is the predetermined period, in accordance with this description and stops the processing if the set includes a sheet other than the blank sheets. The collator 16 removes the sheets from the current sheet to the subsequent "media-1" sheet from each input bin and returns the number of sets at the time when the collator 16 detects that the set includes a sheet other than the blank sheets to the PC 1.

Processes in the first exemplary embodiment will now be described.

Figure 20:
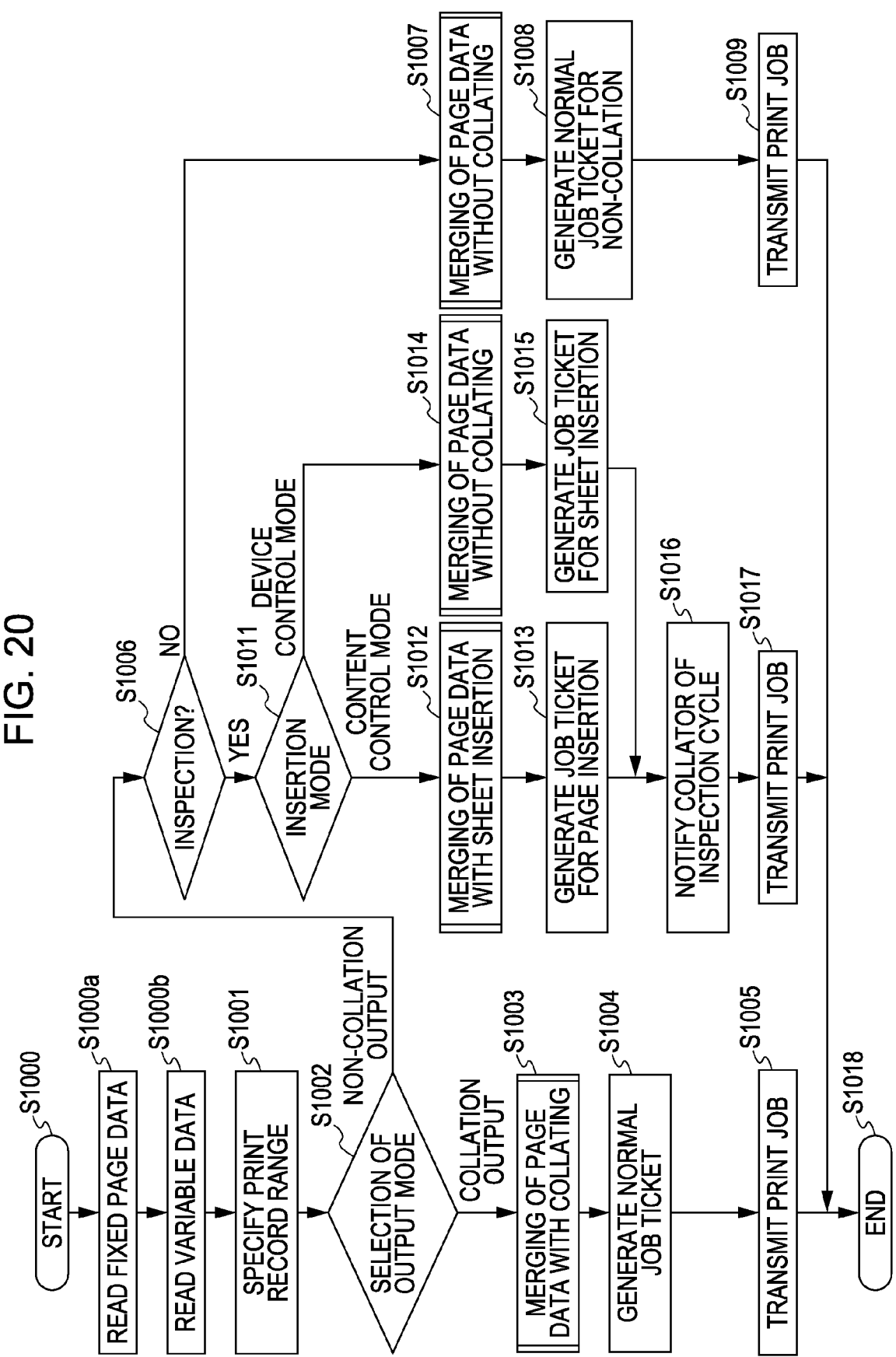
FIG. 20 is a flowchart showing an example of a variable printing process in the personal computer in FIG. 2.

FIG. 20 is a flowchart showing an example of a variable printing process in the PC 1 in FIG. 2.

In Step S1000, the PC 1 starts the variable printing process. In Step S1000a, the page data merger 10 reads out fixed page data from the content receiver 7. In Step S1000b, the page data merger 10 reads out variable data from the variable database 6.

In Step S1001, the print range determiner 12 specifies the range of records to be printed. The record range specified in Step S1001 corresponds to the information (input values) set in the input fields 109 and 110 on the screen in FIG. 3. It is assumed in the following description that these input values are reflected in the first record and the number of records.

In Step S1002, the collation determiner 8 determines the output mode in accordance with the setting of the check button 111 on the screen in FIG. 3. If the printed sheets are output on a normal record-by-record basis, that is, the check button 111 is turned off (COLLATION OUTPUT in step S1002), the process goes to Step S1003. If the printed sheets are output on a page-by-page basis, that is, the check button 111 is turned on (NON-COLLATION OUTPUT in step S1002), the process goes to Step S1006.

In Step S1003, the page data merger 10 merges the fixed page data in FIG. 4 with the variable data in FIG. 5 for the output on a record-by-record basis to compose page data to be printed. In Step S1004, the job ticket generator 11 generates a job ticket used to control the digital printer 3. The job ticket generated in Step S1004 corresponds to the job ticket shown in FIG. 13 and the disjointing cycle corresponds to the number of pages per one record. In Step S1005, the page data merger 10 transmits the page data to the digital printer 3 and the job ticket generator 11 transmits the job ticket to the digital printer 3.

In Step S1006, the inspection cycle receiver 9 determines whether the inspection is performed in the offline collation in the output on a page-by-page basis in accordance with whether the check button 113 or 114 in FIG. 3 is turned on. If the inspection cycle receiver 9 determines that the inspection is performed (YES in step S1006), the process goes to Step S1011. If the inspection cycle receiver 9 determines that the inspection is not performed (NO in step S1006), the process goes to Step S1007. In Step S1011, the inspection cycle receiver 9 determines the insertion mode for the inspection. If the check button 113 on the screen in FIG. 3 is turned on (CONTENT CONTROL MODE in step S1011), the process goes to Step S1012. If the check button 114 on the screen in FIG. 3 is turned on (DEVICE CONTROL MODE in step S1011), the process goes to Step S1014.

In Step S1012, the page data merger 10 merges the page data such that the printed sheets are output on a page-by-page basis and the blank pages for inspection is included in the merging of the page data. In Step S1013, the job ticket generator 11 generates the job ticket used to control the digital printer 3 in accordance with the page data merged in Step S1012. The job ticket generated in Step S1013 corresponds to the job ticket shown in FIG. 14 and the disjointing cycle corresponds to the sum of the number of records in the range of the records to be printed and the number of blank pages inserted on a page-by-page basis.

In Step S1014, the page data merger 10 merges the page data such that the printed sheets are output on a page-by-page basis. In Step S1015, the job ticket generator 11 generates the job ticket causing the digital printer 3 to insert the blank sheets. The job ticket generated in Step S1015 corresponds to the job ticket shown in FIG. 15 and the disjointing cycle corresponds to the number of records in the range of the records to be printed excluding the blank sheets to be inserted.

In Step S1016, the job ticket generator 11 notifies the collator 16 of the cycle on which the set of only the blank pages/sheets appears in the output from the collator 16. The notification is performed by transmitting the job ticket shown in FIG. 19. In Step S1017, the PC 1 (or the page data merger 10 and the job ticket generator 11) transmits the page data and the job ticket to the digital printer 3. If it is necessary to control the offset printer and the offline post-processor in conjunction with the digital printer, the job tickets shown in FIGS. 16, 17, and 18 are transmitted to the printers and processor.

In Step S1007, the page data merger 10 merges the page data such that the printed sheets are output on a page-by-page basis. In Step S1008, the job ticket generator 11 generates the job ticket to instruct that no blank page is inserted. The job ticket generated in Step S1015 corresponds to the job ticket shown in FIG. 13 and the disjointing cycle corresponds to the number of records in the range of the records to be printed. In Step S1009, the PC 1 (or the page data merger 10 and the job ticket generator 11) transmits the page data and the job ticket to the digital printer 3.

In Step S1018, the variable printing process in FIG. 20 terminates in any of the above cases.

The merging of the page data in Steps S1003, S1014, S1007, and S1012 will now be sequentially described in detail.

Figure 21:
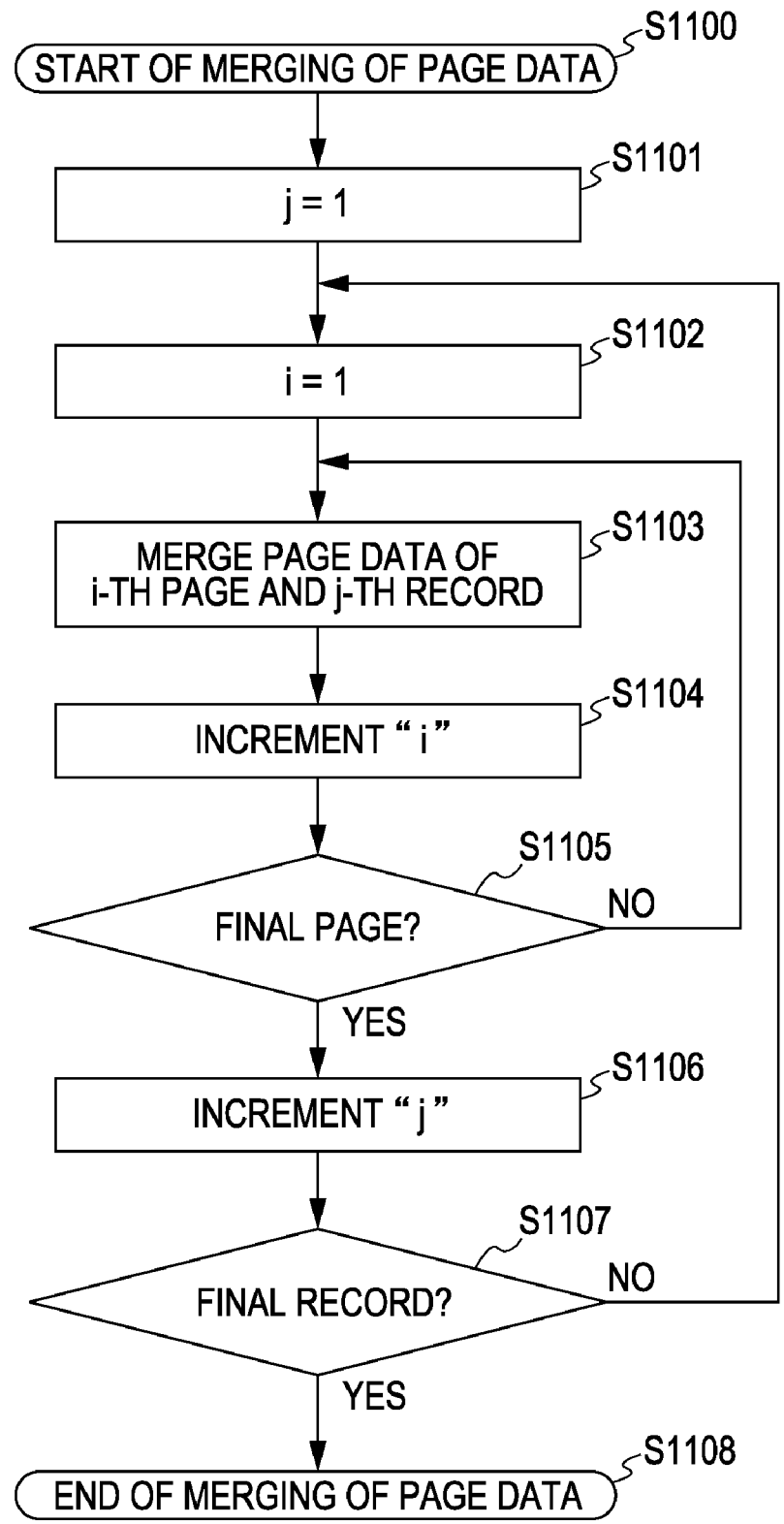
FIG. 21 is a flowchart showing an example of merging of page data on a record-by-record basis in a step in FIG. 20.

FIG. 21 is a flowchart showing an example of the merging of the page data on a record-by-record basis in Step S1003 in FIG. 20.

In Step S1100, the page data merger 10 starts the merging of the page data.

In Step S1101, the page data merger 10 initializes a variable j to count the number of records to be processed. A value of one that is substituted indicates the first record in the specified range of records.

In Step S1102, the page data merger 10 initializes a variable i to count the number of pages to be processed.

In Step S1103, the page data merger 10 merges the page data in the records the count of which is specified by the variable j with the page data on the pages the count which is specified by the variable i.

In Step S1104, the page data merger 10 increments the variable i to count the number of pages to proceed to the subsequent page.

In Step S1105, the page data merger 10 determines whether the processing of the final page is completed. If the page data merger 10 determines that the processing of the final page is completed (YES in step S1105), the process goes to Step S1106. If the page data merger 10 determines that an unprocessed page remains (NO in step S1105), the process goes back to Step S1103.

In Step S1106, the page data merger 10 increments the variable j to count the number of records to proceed to the subsequent record.

In Step S1107, the page data merger 10 determines whether the processing of the final record is completed. If the page data merger 10 determines that the processing of the final record is completed (YES in step S1107), the process goes to Step S1108 and the merging of the page data in FIG. 21 terminates. If the page data merger 10 determines that an unprocessed record remains (NO in step S1107), the process goes back to Step S1102.

Figure 22:
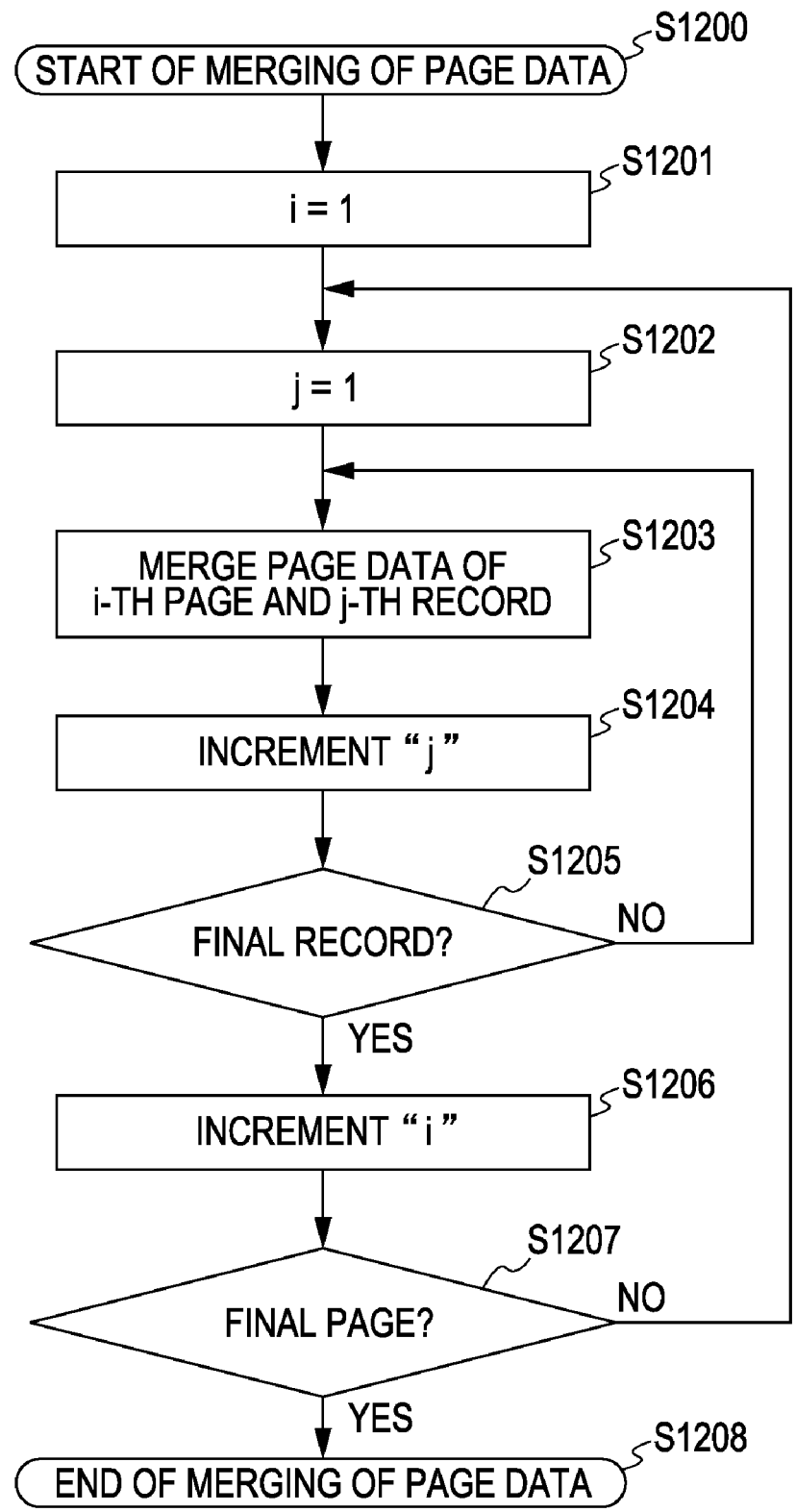
FIG. 22 is a flowchart showing an example of the merging of the page data on a page-by-page basis in other steps in FIG. 20.

FIG. 22 is a flowchart showing an example of the merging of the page data on a page-by-page basis in Steps S1014 and S1007 in FIG. 20.

In Step S1200, the page data merger 10 starts the merging of the page data.

In Step S1201, the page data merger 10 initializes a variable i to count the number of pages to be processed.

In Step S1202, the page data merger 10 initializes a variable j to count the number of records to be processed. A value of one that is substituted indicates the first record in the specified range of records.

In Step S1203, the page data merger 10 merges the page data in the records the count of which is specified by the variable j with the page data on the pages the count which is specified by the variable i.

In Step S1204, the page data merger 10 increments the variable j to count the number of records to proceed to the subsequent page.

In Step S1205, the page data merger 10 determines whether the processing of the final record is completed. If the page data merger 10 determines that the processing of the final record is completed (YES in step S1205), the process goes to Step S1206. If the page data merger 10 determines that an unprocessed record remains (NO in step S1205), the process goes back to Step S1203.

In Step S1206, the page data merger 10 increments the variable i to count the number of pages to proceed to the subsequent page.

In Step S1207, the page data merger 10 determines whether the processing of the final page is completed. If the page data merger 10 determines that the processing of the final page is completed (YES in step S1207), the process goes to Step S1208 and the merging of the page data in FIG. 22 terminates. If the page data merger 10 determines that an unprocessed page remains (NO in step S1207), the process goes back to Step S1202.

Figure 23:
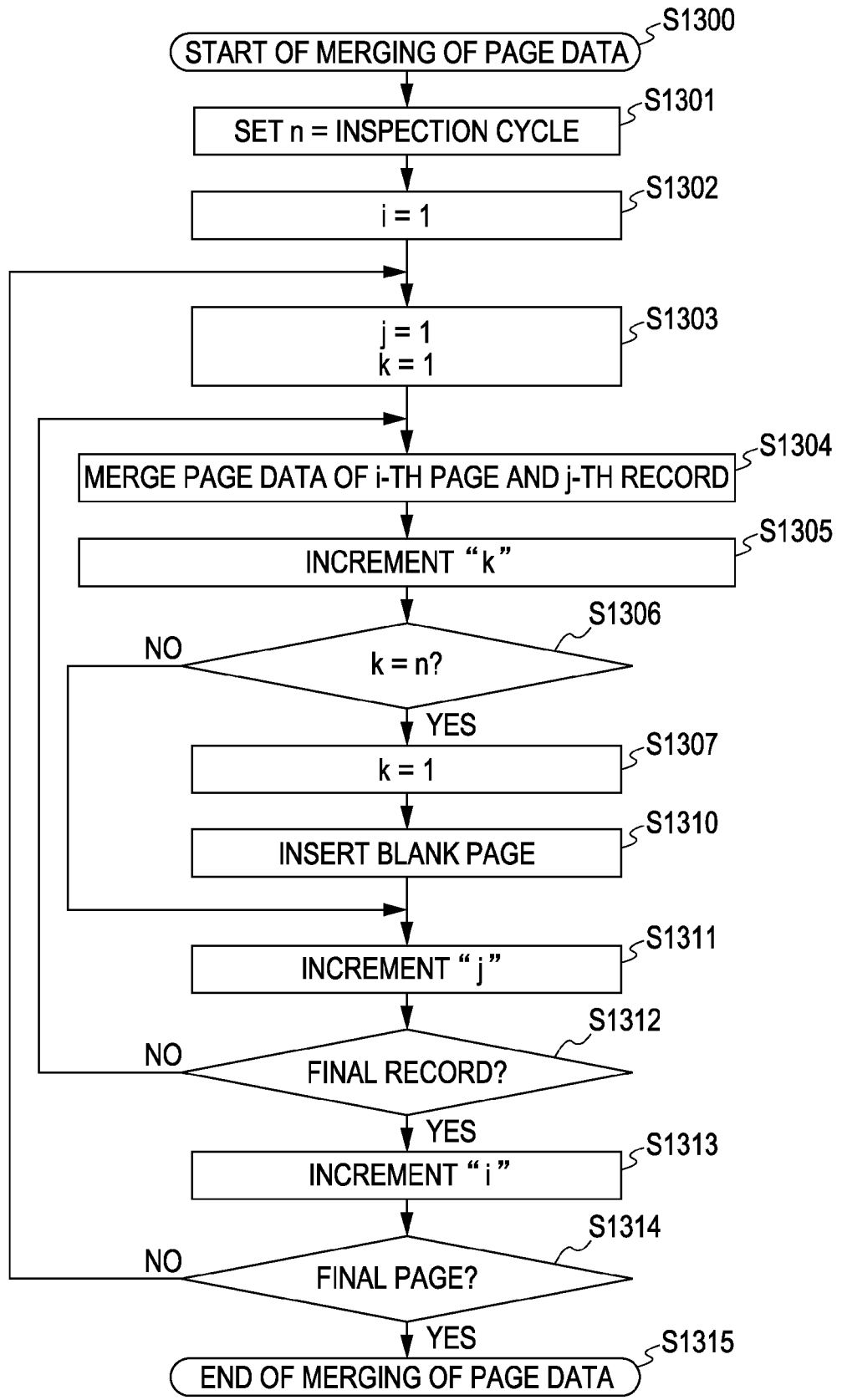
FIG. 23 is a flowchart showing an example of the merging of the page data on a page-by-page basis with blank pages inserted in another step in FIG. 20.

FIG. 23 is a flowchart showing an example of the merging of the page data on a page-by-page basis with the blank pages inserted in Step S1012 in FIG. 20.

In Step S1300, the page data merger 10 starts the merging of the page data.

In Step S1301, the page data merger 10 receives an inspection cycle n from the inspection cycle receiver 9. When the inspection is performed in units of 100 sets, the page data merger 10 sets the value of the inspection cycle n to "100".

In Step S1302, the page data merger 10 initializes a variable i to count the number of pages to be processed.

In Step S1303, the page data merger 10 initializes a variable j to count the number of records to be processed and a variable k to count the number of records for the insertion of the blank pages.

In Step S1304, the page data merger 10 merges the page data in the records the count of which is specified by the variable j with the page data on the pages the count which is specified by the variable i.

In Step S1305, the page data merger 10 increments the variable k to count the number of records for the insertion of the blank pages. In Step S1306, the page data merger 10 determines whether the blank page should be inserted. If the variable k to count the number of records for the insertion of the blank pages coincides with the inspection cycle n, the blank page should be inserted. If the blank page is to be inserted (YES in step S1306), the process goes to Step S1307. If the blank page is not to be inserted (NO in step S1306), the process goes to Step S1311.

In Step S1307, the page data merger 10 resets the variable k to count the number of records for the insertion of the blank page.

In Step S1310, the page data merger 10 inserts the blank page. When the insertion of the blank page is completed, the process goes to Step S1311.

In Step S1311, the page data merger 10 increments the variable j to count the number of records to proceed to the subsequent record.

In Step S1312, the page data merger 10 determines whether the processing of the final record is completed. If the page data merger 10 determines that the processing of the final record in the current page is completed (YES in step S1312), the process goes to Step S1313. If the page data merger 10 determines that an unprocessed record remains (NO in step S1312), the process goes back to Step S1304.

In Step S1313, the page data merger 10 increments the variable i to count the number of pages to proceed to the subsequent page.

In Step S1314, the page data merger 10 determines whether the processing of the final page is completed. If the page data merger 10 determines that the processing of the final page is completed (YES in step S1314), the process goes to Step S1315 and the merging of the page data in FIG. 23 terminates. If the page data merger 10 determines that an unprocessed page remains (NO in step S1314), the process goes back to Step S1303.

Figure 24:
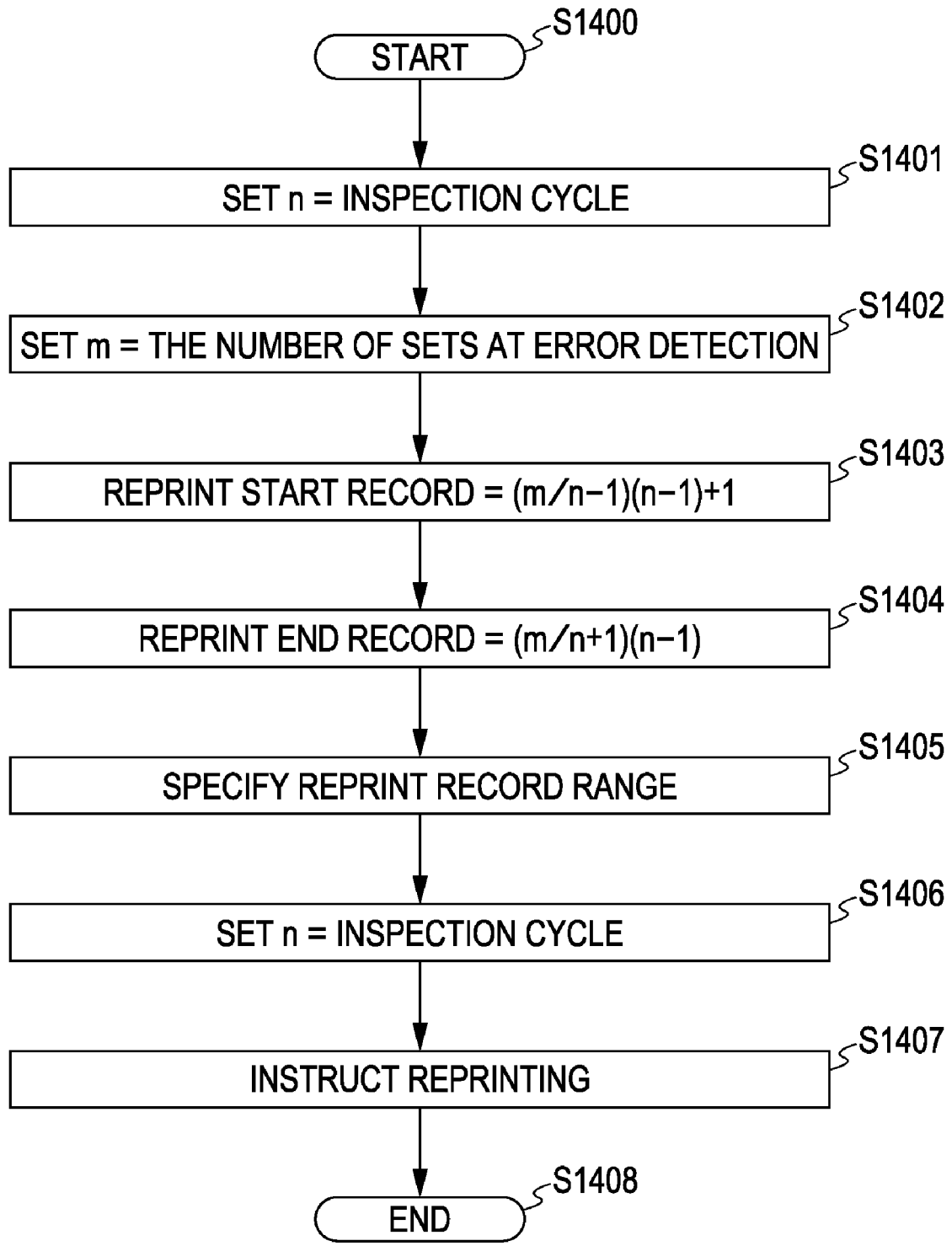
FIG. 24 is a flowchart showing an example of a process of calculating the range where reprinting is performed after the collator is stopped.

FIG. 24 is a flowchart showing an example of a process of calculating the range where the reprinting is performed after the collator is stopped. The process shown in FIG. 24 is performed if the double feeding is detected in the collator 16 as the result of confirmation of the presence of the set of only the blank pages on a cycle of a predetermined number of sets, that is, if the set that should include only the blank pages include a printed page. This process is performed by the reprint range calculator 13 and the print range determiner 12.

In Step S1400, the reprint range calculator 13 starts the process of calculating the reprint range when information is received from, for example, the collator 16. In Step S1401, the reprint range calculator 13 sets the inspection cycle n on the basis of information from, for example, the collator 16. For example, when the inspection is performed in units of 100 sets, the reprint range calculator 13 sets the value of the inspection cycle n to "100".

In Step S1402, the reprint range calculator 13 sets a number m of sets at the time when an error is detected on the basis of the information from, for example, the collator 16 (setting of the number of sets at error detection). For example, when the reprint range calculator 13 detects that the 500-th set that should include only the blank pages includes a printed page in the inspection of the set, the reprint range calculator 13 sets the value of the number m to "500".

In Step S1403, the reprint range calculator 13 calculates a reprint start record from the values of the number m and the inspection cycle n.

In Step S1404, the reprint range calculator 13 calculates a reprint end record from the values of the number m and the inspection cycle n.

In Step S1405, the print range determiner 12 specifies the reprint record range between the reprint start record and the reprint end record calculated by the reprint range calculator 13. In Step S1406, the print range determiner 12 sets the inspection cycle n in the reprinting on the basis of information from, for example, the user interface 14.

In Step S1407, the print range determiner 12 instructs the processes shown in FIGS. 20 to 24 again. In Step S1408, the process of calculating the reprint range in FIG. 24 terminates.

It is assumed that the single-sided printing is performed in the above processes. In the case of duplex printing, it is necessary to merge the page data in units of two pages in the printing on a page-by-page basis and to insert the blank pages corresponding to two pages in the insertion of the blank pages.

As described above, according to the first exemplary embodiment, since the merging of the page data on a page-by-page basis can be selected in the variable printing, the jobs can be merged with the outputs from another printer or another offset printer by using the offline collator.

In addition, control of the merging of the page data or the sheet insertion in the digital printer, which is an example of the image forming unit, allows the shift in the collation to be easily detected in units of sets of a predetermined number. Since the insertion of the pages or sheets for the inspection produces the page sets including only the blank pages/sheets in the collation, it is possible to easily confirm the erratic pagination both in the visual confirmation and in the automatic recognition process. Since not only the erratic pagination in a single page set but also the erratic pagination in continuous two page sets can be detected, the first exemplary embodiment is also effective for the print jobs in, for example, the variable printing in which the matching between the page sets and the variable data is important.

Furthermore, changing the type of sheets in the sheet insertion as in the job ticket in FIG. 15 allows inappropriate sheets to be removed from the collator in the time period from the stop of the collation to the restart thereof. Furthermore, it is possible to easily calculate the reprint record range appropriate for the reprinting after the erratic pagination occurs.

Although it is determined whether the printing on a set-by-set basis or a record-by-record basis or the printing on a page-by-page basis is performed on the basis of the instruction input with the user interface in the first exemplary embodiment, the determination may be performed by anther method. For example, the collation determiner 8 may determine that the printing on a page-by-page basis is performed when the merging with the jobs of the offset printer is performed because the collator 16 is necessary in this case. Alternatively, the collation determiner 8 may determine that the printing on a page-by-page basis is performed if the offline post-processor B 5 is necessary even when the merging with the jobs of the offset printer is not performed. Accordingly, there is an advantage similar to that in the first exemplary embodiment even when the collation determiner 8 switches between the printing on a record-by-record basis and the printing on a page-by-page basis in accordance with determination criteria different from those in the first exemplary embodiment.

Since the basic configuration of a second exemplary embodiment is similar to that of the first exemplary embodiment, only the difference from the first exemplary embodiment will be described in the second exemplary embodiment.

The blank pages or sheets are inserted in order to confirm whether the collation is performed without the double feeding in the first exemplary embodiment. In contrast, markings are printed on sheets to be inserted in the second exemplary embodiment. The markings, which have an advantage similar to that of the blank pages, can be used to determine which pages and records the inserted pages correspond to. The markings, such as barcodes and copy-forgery-inhibited patterns, which do not suppress the inspection when the inserted pages are visually confirmed should be used. It is assumed in the following description for simplicity that the barcodes are printed on the inserted sheets.

Figure 25:
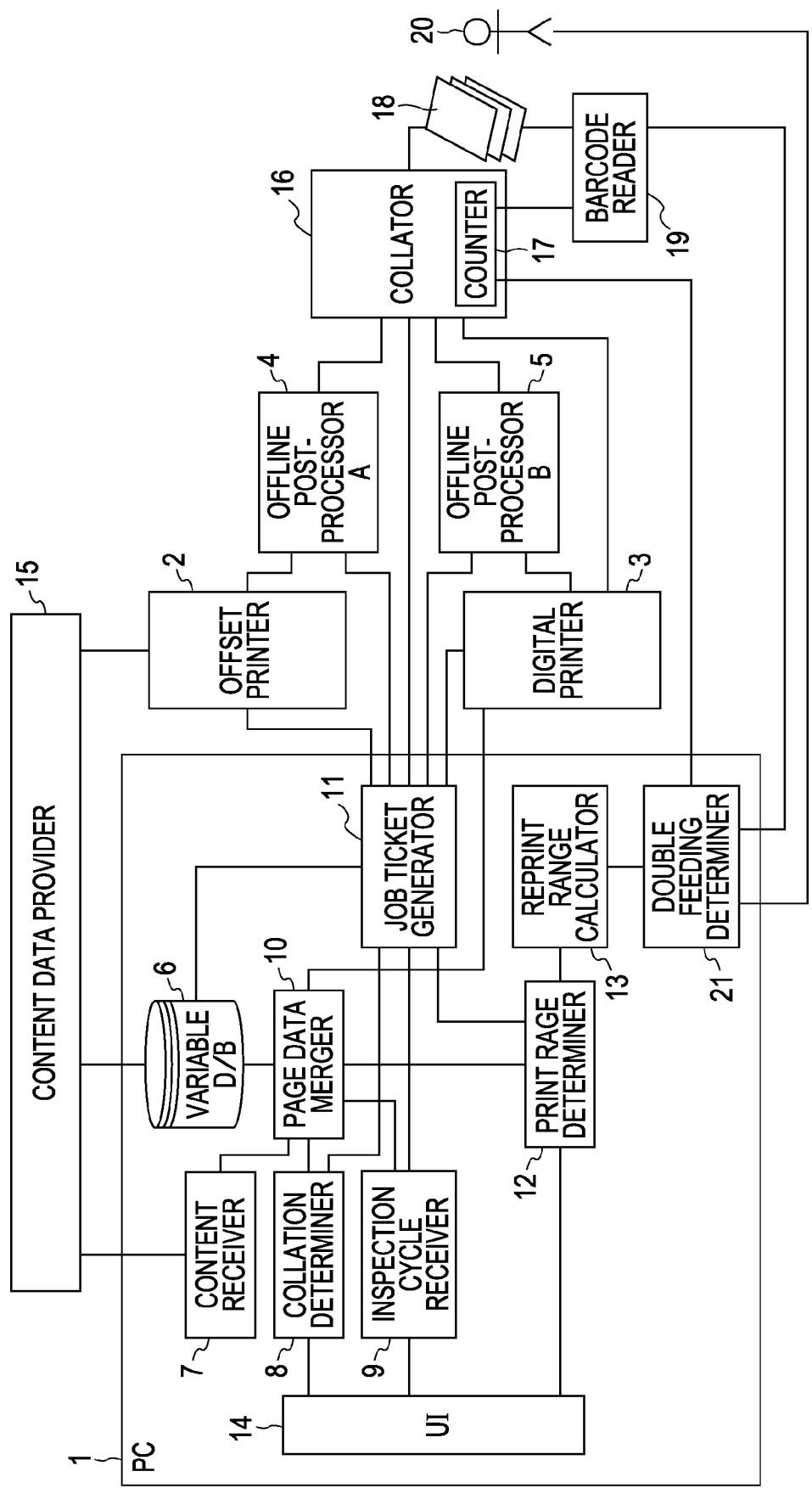
FIG. 25 is a block diagram showing an example of the functional configuration of a system according to a second exemplary embodiment.

FIG. 25 is a block diagram showing an example of the functional configuration of a system according to the second exemplary embodiment.

The collator 16 includes a counter 17 to count the number of output sheets after the collation. The system includes a barcode reader 19 that reads the barcodes printed on the sheets in the sets of only the blank pages from page sets 18 after the collation, in addition to the components in the first exemplary embodiment shown in FIG. 2.

Referring to FIG. 25, reference numeral 20 denotes an operator conducting the inspection. Reference numeral 21 denotes a double feeding determiner included in the PC 1.

The barcode reader 19 reads the barcodes printed on the sheets in the page sets on a predetermined inspection cycle from the output sheets of the number counted by the counter 17 and transmits the information about the barcodes to the double feeding determiner 21. The operator 20 visually confirms whether only the blank pages are included in the page sets as in the first exemplary embodiment. The counter 17 transmits the information to the double feeding determiner 21 to indicate what number page set the information from the barcode reader 19 is read out from.

Figure 26:
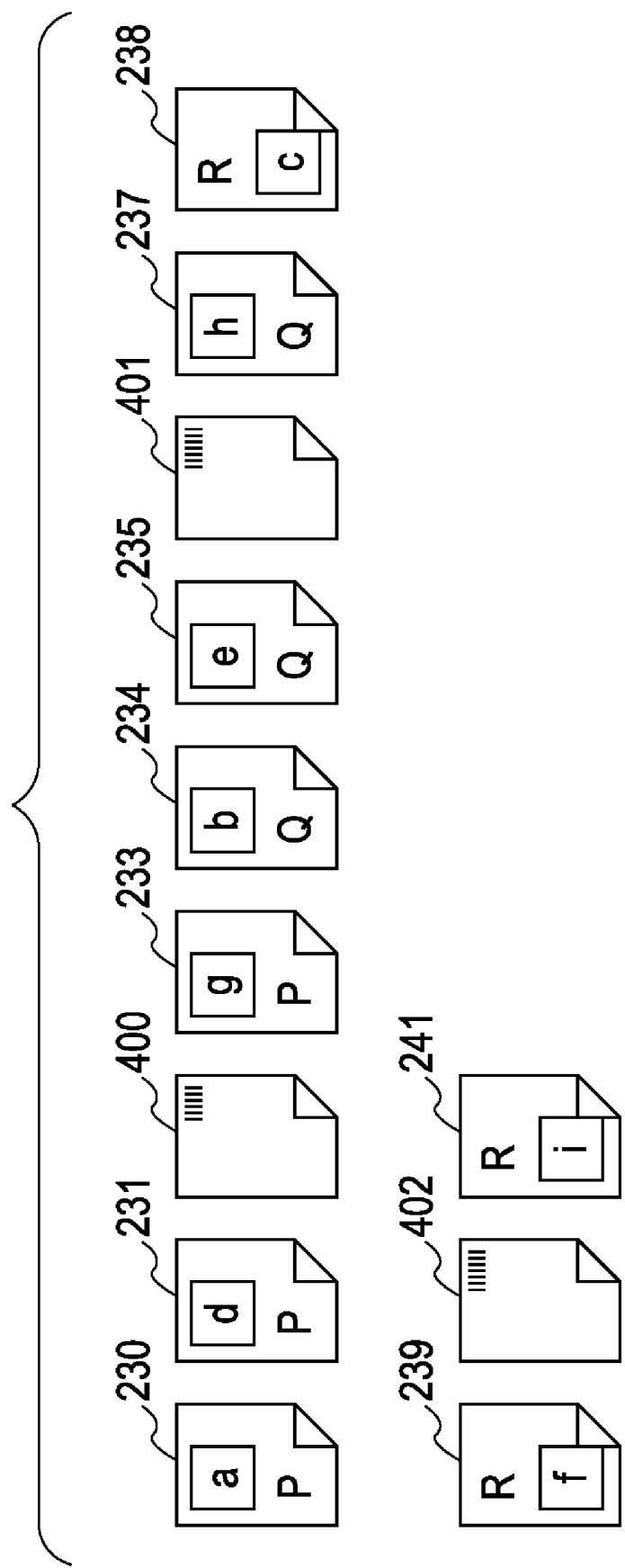
FIG. 26 shows an example of the output order of pages when the pages for inspection are inserted according to the second exemplary embodiment, corresponding to FIG. 10 in the first exemplary embodiment.

FIG. 26 shows an example of the output order of pages when the pages for inspection are inserted according to the second exemplary embodiment. FIG. 26 corresponds to FIG. 10 in the first exemplary embodiment.

Referring to FIG. 26, reference numeral 400 denotes a blank page with a barcode inserted as the third set in the first page, that is, inserted after the second record. Similarly, reference numeral 401 denotes a blank page with a barcode inserted as the third set in the second page and reference numeral 402 denotes a blank page with a barcode inserted as the third set in the third page.

The page data merger 10 shown in FIG. 25 performs the merging of the page data on the pages output in the order shown in FIG. 26.

Processes according to the second exemplary embodiment will now be described.

Figure 27:
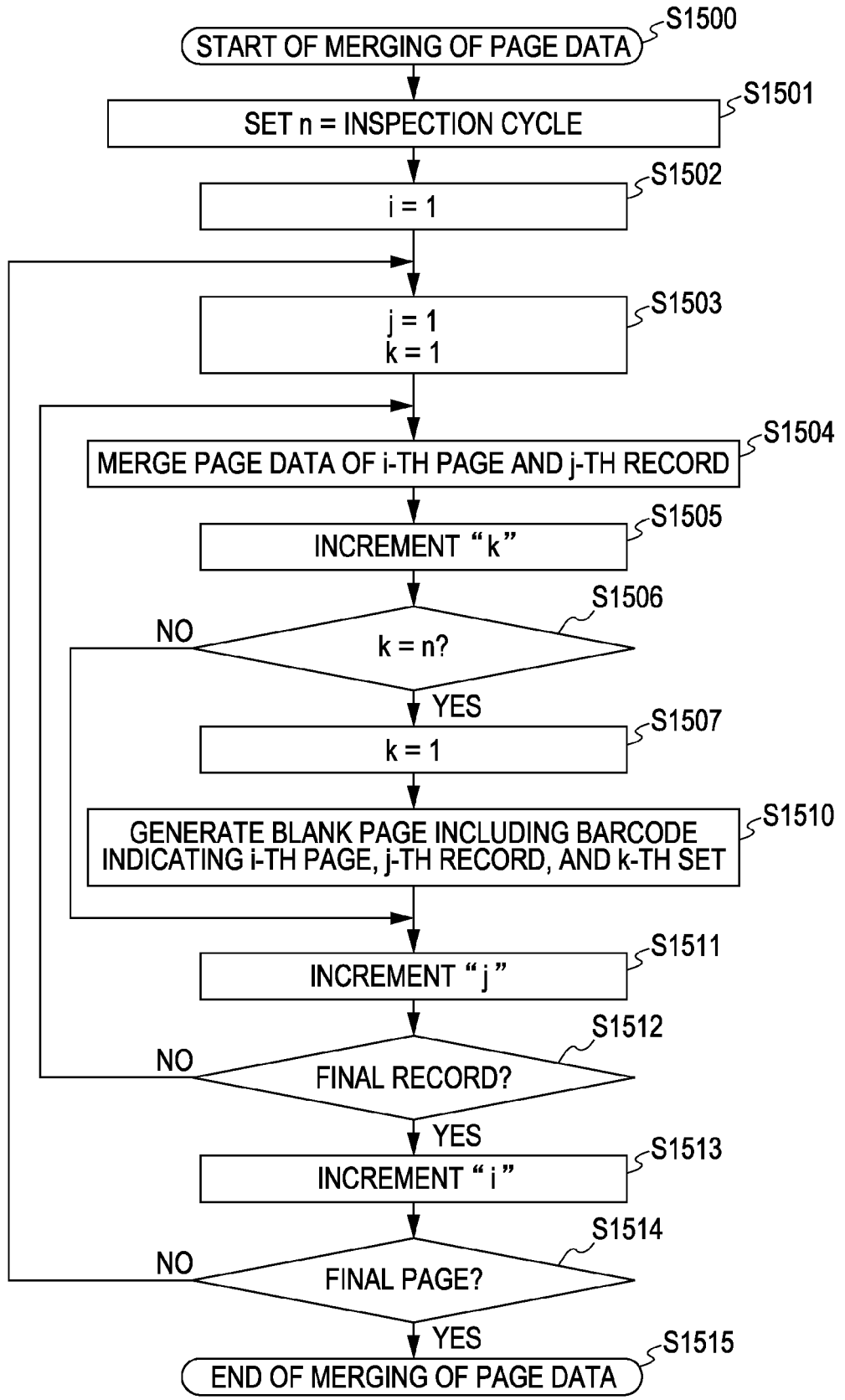
FIG. 27 is a flowchart showing an example of a process of merging the page data with the blank pages inserted according to the second exemplary embodiment, corresponding to FIG. 23 in the first exemplary embodiment.

FIG. 27 is a flowchart showing an example of a process of merging the page data with the blank pages inserted according to the second exemplary embodiment. FIG. 27 corresponds to FIG. 23 in the first exemplary embodiment.

In Step S1500, the page data merger 10 starts the merging of the page data.

In Step S1501, the page data merger 10 receives the inspection cycle n from the inspection cycle receiver 9.

In Step S1502, the page data merger 10 initializes a variable i to count the number of pages to be processed.

In Step S1503, the page data merger 10 initializes a variable j to count the number of records to be processed and a variable k to count the number of records for the insertion of the blank pages.

In Step S1504, the page data merger 10 merges the page data in the records the count of which is specified by the variable j with the page data on the pages the count which is specified by the variable i.

In Step S1505, the page data merger 10 increments the variable k to count the number of records for the insertion of the blank pages. In Step S1506, the page data merger 10 determines whether the blank page should be inserted. If the variable k to count the number of records for the insertion of the blank pages coincides with the inspection cycle n, the blank page should be inserted. If the blank page is to be inserted (YES in step S1506), the process goes to Step S1507. If the blank page is not to be inserted (NO in step S1506), the process goes to Step S1511.

In Step S1507, the page data merger 10 resets the variable k to count the number of records for the insertion of the blank page.

In Step S1510, the page data merger 10 generates a blank page on which a barcode including information about the current page number, the current record number, and the current number of sets including the sets of the blank pages is printed and inserts the generated blank page. When the insertion of the blank page is completed, the process goes to Step S1511.

In Step S1511, the page data merger 10 increments the variable j to count the number of records to proceed to the subsequent record.

In Step S1512, the page data merger 10 determines whether the processing of the final record is completed. If the page data merger 10 determines that the processing of the final record in the current page is completed (YES in step S1512), the process goes to Step S1513. If the page data merger 10 determines that an unprocessed record remains (NO in step S1512), the process goes back to Step S1504.

In Step S1513, the page data merger 10 increments the variable i to count the number of pages to proceed to the subsequent page.

In Step S1514, the page data merger 10 determines whether the processing of the final page is completed. If the page data merger 10 determines that the processing of the final page is completed (YES in step S1514), the process goes to Step S1515 and the process of merging the page data in FIG. 23 terminates. If the page data merger 10 determines that an unprocessed page remains (NO in step S1514), the process goes back to Step S1503.

Figure 28:
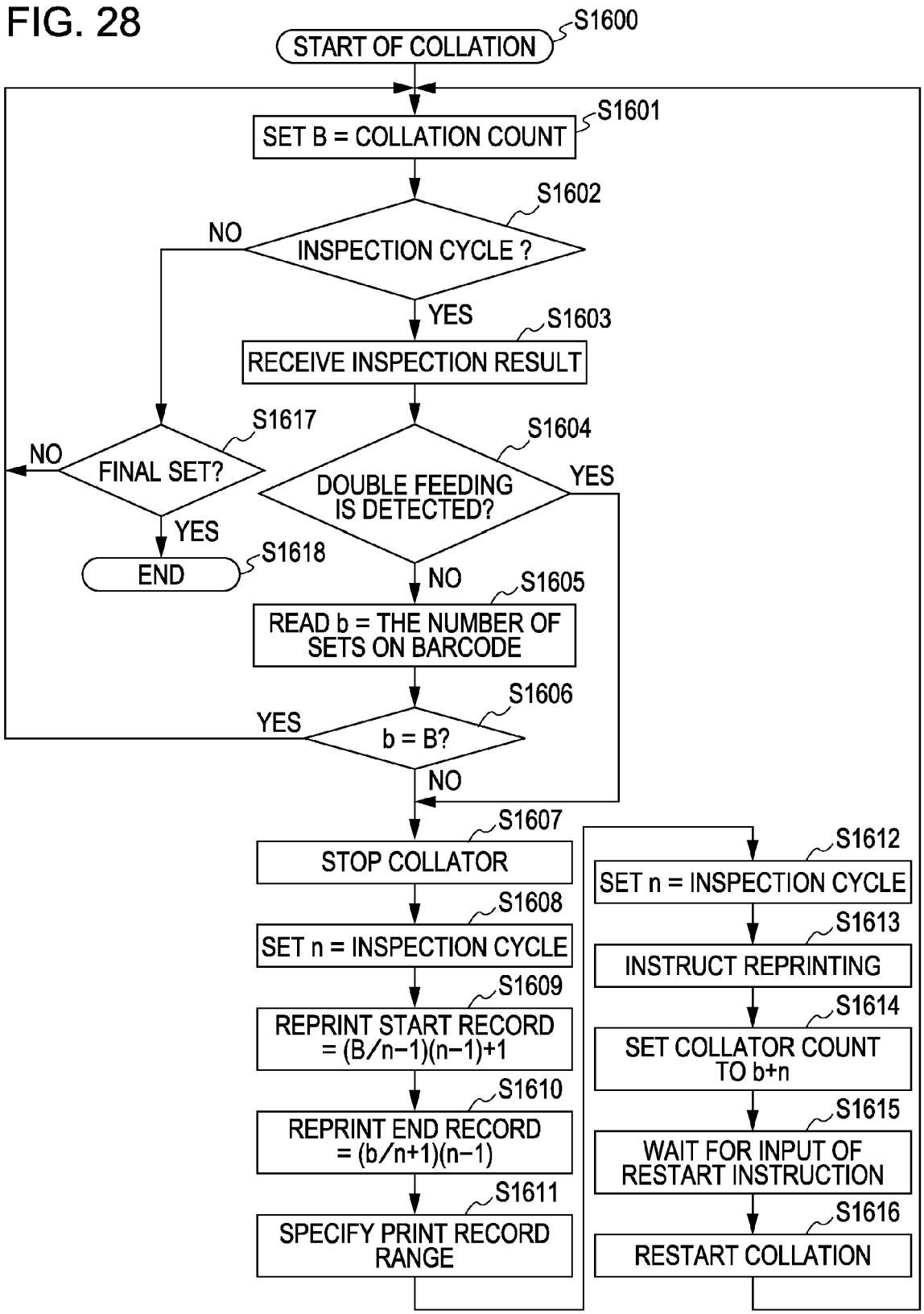
FIG. 28 is a flowchart showing an example of a double feeding detection and recovery process in collation performed by the personal computer.

FIG. 28 is a flowchart showing an example of a double feeding detection and recovery process.

In Step S1600, the PC 1 (for example, the double feeding determiner 21) starts the collating process. In Step S1601, the double feeding determiner 21 receives a collation count B from the counter 17. In Step S1602, the double feeding determiner 21 determines whether the collation count B is on a predetermined inspection cycle. If the double feeding determiner 21 determines that the set is to be inspected (YES in step S1602), the process goes to Step S1603. Otherwise (NO in step S1602), the process goes to Step S1617.

In Step S1603, the double feeding determiner 21 receives the confirmation result of the set of the blank pages by the operator 20. In Step S1604, the double feeding determiner 21 determines whether the double feeding occurs on the basis of the input result. If the double feeding determiner 21 determines that the set that should include only the blank pages include a printed page (YES in step 1604), the process goes to Step S1607. Otherwise (NO in step S1604), the process goes to Step S1605.

In Step S1605, the double feeding determiner 21 reads a number b of sets recorded on the barcode on the set to be inspected from the barcode reader 19.

In Step S1606, the double feeding determiner 21 compares the value b on the barcode with the collation count B. If the double feeding determiner 21 determines that the value b on the barcode coincides with the collation count B (YES in step S1606), the process goes back to Step S1601 because no double feeding occurs. If the double feeding determiner 21 determines that the value b on the barcode does not coincide with the collation count B (NO in step S1606), the process goes to Step S1607 because the double feeding occurs.

In Step S1607, the double feeding determiner 21 stops the collator.

In Step S1608, the reprint range calculator 13 calculates the inspection cycle n from, for example, the double feeding determiner 21.

In Step S1609, the reprint range calculator 13 calculates the reprint start record from the collation count B and the inspection cycle n. For example, when the inspection is performed in units of 10 sets (n=10) and an error is detected in the 50-th set (B=50), the double feeding should occur at a record from the 41-th set (B−n+1) (=n*(B/n−1)+1) to the current number of sets because the double feeding did not occur in the 40-th set (B−n) (=n*(B/n−1)). In terms of the record, the double feeding occurs at a record from the 37-th record ((n−1)*(B/n−1)+1=37), which is given by replacing "n*" with "(n−1)*" and adding one (indicating the next set), to the current record. In other words, the reprinting should be started from the reprint start record.

In Step S1610, the reprint range calculator 13 calculates the reprint end record from the number b of sets recorded on the barcode and the inspection cycle n. For example, when the 60-th set is read from the barcode under the above conditions (b=60), the inserted sheets can be removed up to the 70-th set to recover the 71-th and subsequent sets because the recovery can be made in the subsequent sets in units of n sets. When the b-th set is read from the barcode, it is necessary to reprint the sets up to the b+n-th set. If the number of sets of the inserted sheets for inspection is excluded, it is necessary to reprint the sets up to the b+n-th set. Since the adjacent set of the b+n-th set is the 63-th record ((n−1*(b+n)/n=63), it is necessary to reprint the records up to the 63-th record.

In Step S1611, the print range determiner 12 specifies the range between the reprint start record and the reprint end record, which are calculated by the reprint range calculator 13.

In Step S1612, the print range determiner 12 sets the inspection cycle n in the reprinting on the basis of information from, for example, the user interface 14.

In Step S1613, the print range determiner 12 instructs the processes shown in FIGS. 20 to 24 again.

In Step S1614, the double feeding determiner 21 resets the collation count in the collator 16. Here, the operator 20 removes the sheets from the current sheet to the next insertion sheet from each input bin of the collator 16. This allows the normal collating process to be continued.

In Step S1615, the collator 16 (or the double feeding determiner 21) waits for a restart instruction input by the operator 20, indicating the completion of the removal of the sheets.

In Step S1616, the collator 16 restarts the collation and the process goes back to Step S1601.

In Step S1617, the double feeding determiner 21 determines whether the collation of the final set is completed. If the double feeding determiner 21 determines that the collation of the final set is completed (YES in step S1617), the process goes to Step S1618 and the double feeding detection and recovery process terminates. If the double feeding determiner 21 determines that the collation of the final set is not completed (NO in step S1617), the process goes back to Step S1601 to repeat the above steps.

As described above, the double feeding can be more accurately and reliably detected and the recovery of the process and the reprinting can be performed not only by inserting the simple blank pages but also by printing the markings including the information with which the inspection position can be calculated.

In addition, the use of the counter of the number of sets and the barcode reader in the collation allows the inspection process to be automated.

According to the method described in the second exemplary embodiment, it is possible to detect the erratic pagination and to recover the system from an abnormal state even in an extremely rare case in which the double feeding cannot be detected by the visual inspection, such as when the sheets of the same number are subjected to the double feeding in all the pages.

Since the basic configuration of a third exemplary embodiment is similar to that of the first exemplary embodiment, only the difference from the first exemplary embodiment will be described in the third exemplary embodiment.

According to the first example embodiment, the output sheets are moved to the offline post-processor B 5 or the collator 16 by outputting the sheets from the digital printer 3 while being disjointed on a page-by-page basis.

In contrast, according to the third exemplary embodiment, an example in which multiple output bins of the digital printer 3 are used will be described.

FIG. 29 shows an example of a job ticket according to the third exemplary embodiment. The job ticket in FIG. 29 corresponds to the job ticket shown in FIG. 14 in the first exemplary embodiment.

In the fourth line of the job ticket in FIG. 29, a description "<OutputBin Page="1 to 4" Location="Bin1"/>" indicates that the first to fourth pages are output to an output bin "Bin1". Similarly, the fifth line indicates that the subsequent four pages are output to an output bin "Bin2" and the sixth line indicates that the final four pages are output to an output bin "Bin3".

FIG. 30 shows an example of another job ticket according to the third exemplary embodiment. The job ticket in FIG. 30 corresponds to the job ticket shown in FIG. 15 in the first exemplary embodiment. As in the example in FIG. 29, the thirteenth to fifteenth lines indicate that pages are sequentially output to the output bins "Bin1", "Bin2", and "Bin3" in units of three pages from the first page.

As described above, according to the third exemplary embodiment, since the pages are output to the multiple output bins in units of pages of a predetermined number in the output on a page-by-page basis in the variable printing, the outputs can be easily moved. More specifically, the outputs can be easily moved without error when the outputs are moved from the digital printer to the offline post-processor or collator. The merging of the page data on a page-by-page basis can be combined with the switching between the output bins to further facilitate the cooperation between the variable printing and the offline post-processing.

The present invention can be embodied by supplying the computer-readable storage medium (or the recording medium) storing software program code realizing the functions according to the above embodiments to a system or an apparatus, the central processing unit (CPU) or micro processing unit (MPU) in which system or apparatus reads out and executes the program code stored in the computer-readable storage medium. In this case, the present invention is embodied by the program code itself read out from the computer-readable storage medium. The present invention is applicable to the computer-readable storage medium storing the program code.

The CPU or MPU in the system or the apparatus that executes the readout program code realizes the functions of the embodiments described above. In addition, the operating system (OS) or the like running on the system or apparatus may execute all or part of the actual processing based on instructions in the program code to realize the functions of the embodiments described above.

Alternatively, after the program code read out from the computer-readable storage medium has been written in a memory that is provided in a function expansion card included in the system or apparatus or in a function expansion unit connected to the system or apparatus, the CPU or the like in the function expansion card or the function expansion unit may execute all or part of the actual processing based on instructions in the program code to realize the functions of the embodiments described above.

When the embodiments of the present invention are applied to the computer-readable storage medium, the program code corresponding to the flowcharts described above is stored in the computer-readable storage medium.

According to the above embodiments, it is possible to easily ensure the output results (the alignment of the outputs in all the records) in the VDP.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-298396 filed Nov. 16, 2007, which is hereby incorporated by reference herein in its entirety.

What is claimed is:

1. A printing system comprising an information processing apparatus, a printer and a collator,
the information processing apparatus comprising:
a print data generating unit configured to generate print data instructing to output without collation a printed material of a plurality of records generated by merging fixed data used for a plurality of pages and variable data different from the fixed data and to insert one insertion page in the printed material for every predetermined number of records; and
a transmitting unit configured to transmit the print data to the printer;
the printer comprising:
an output unit configured to output without collation the printed material of the plurality of records and to insert the one insertion page in the printed material for every predetermined number of records, based on the print data,
the collator comprising:
bins configured to receive the printed material of the plurality of records containing the insertion page output without collation;
a collating unit configured to output the printed material output without collation received in the bins as a collated printed material;
an inspection unit configured to inspect the printed material for every predetermined number of records; and
a stopping unit configured to stop processing of the collating unit when the insertion page and the printed material of another record are included in the printed material inspected by the inspection unit.

2. The printing system according to claim 1, wherein the insertion page is a blank page.

3. The printing system according to claim 1, wherein information about the position where the insertion page is inserted is printed on the insertion page.

4. A control method for a printing system having an information processing apparatus, a printer and a collator, the control method comprising:
generating print data instructing to output without collation a printed material of a plurality of records generated by merging fixed data used for a plurality of pages and variable data different from the fixed data and inserting one insertion page in the printed material for every predetermined number of records; and
transmitting the print data to the printer;
outputting without collation the printed material of the plurality of records and to insert the one insertion page in the printed material for every predetermined number of records, based on the print data,
receiving the printed material of the plurality of records containing the insertion page output without collation;
outputting the printed material output without collation received in the bins, by a collating unit, as a collated printed material;
inspecting the printed material for every predetermined number of records; and
stopping processing of the collating unit when the insertion page and the printed material of another record are included in the printed material inspected by the inspection unit.

5. The control method according to claim 4, wherein the insertion page is a blank page.

6. The control method according to claim 4, wherein information about the position where the insertion page is inserted is printed on the insertion page.

7. A computer-readable storage medium having a program stored therein, the program configured to execute a method for a printing system having an information processing apparatus, a printer and a collator, the method comprising:

generating print data instructing to output without collation a printed material of a plurality of records generated by merging fixed data used for a plurality of pages and variable data different from the fixed data and inserting one insertion page in the printed material for every predetermined number of records; and transmitting the print data to the printer;

outputting without collation the printed material of the plurality of records and to insert the one insertion page in the printed material for every predetermined number of records, based on the print data, receiving the printed material of the plurality of records containing the insertion page output without collation;

outputting the printed material output without collation received in the bins, by a collating unit, as a collated printed material;

inspecting the printed material for every predetermined number of records; and stopping processing of the collating unit when the insertion page and the printed material of another record are included in the printed material inspected by the inspection unit.

8. The computer-readable storage medium according to claim 7, wherein the insertion page is a blank page.

9. The computer-readable storage medium according to claim 7, wherein information about the position where the insertion page is inserted is printed on the insertion page.

* * * * *